United States Patent
Sasmaz et al.

(10) Patent No.: US 11,676,108 B1
(45) Date of Patent: Jun. 13, 2023

(54) APPARATUSES, METHODS, AND SYSTEMS FOR GENERATING INTERACTIVE DIGITAL RECEIPTS

(71) Applicant: Block, Inc., San Francisco, CA (US)

(72) Inventors: Yunus Sasmaz, San Francisco, CA (US); Richard Song, San Francisco, CA (US); Bryan D. Power, San Francisco, CA (US); Amir Nathoo, San Francisco, CA (US); Jeffrey Tang, Austin, TX (US)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 16/021,194

(22) Filed: Jun. 28, 2018

Related U.S. Application Data

(63) Continuation of application No. 14/730,860, filed on Jun. 4, 2015, now Pat. No. 10,026,062.

(51) Int. Cl.
*G06G 1/12* (2006.01)
*G06Q 20/00* (2012.01)
*G06Q 10/1053* (2023.01)
*G06Q 20/20* (2012.01)
*G07G 1/14* (2006.01)
*G07G 5/00* (2006.01)

(52) U.S. Cl.
CPC ....... *G06Q 10/1053* (2013.01); *G06Q 20/202* (2013.01); *G07G 1/14* (2013.01); *G07G 5/00* (2013.01)

(58) Field of Classification Search
None
See application file for complete search history.

(56) References Cited

U.S. PATENT DOCUMENTS

| | | | |
|---|---|---|---|
| 5,315,093 A | 5/1994 | Stewart |
| 5,590,038 A | 12/1996 | Pitroda |
| 5,649,115 A | 7/1997 | Schrader et al. |
| 5,960,411 A | 9/1999 | Hartman et al. |
| 6,026,387 A | 2/2000 | Kesel |
| 6,076,079 A | 6/2000 | Boston et al. |
| 6,341,353 B1 | 1/2002 | Herman et al. |

(Continued)

FOREIGN PATENT DOCUMENTS

| | | | |
|---|---|---|---|
| AU | 2018205104 A1 | 7/2018 |
| AU | 2022224849 A1 | 9/2022 |

(Continued)

OTHER PUBLICATIONS

Advisory Action dated Apr. 26, 2019, for U.S. Appl. No. 14/220,064, of Maxwell, D.W., et al., filed Mar. 19, 2014.

(Continued)

*Primary Examiner* — Ariel J Yu
(74) *Attorney, Agent, or Firm* — Lee & Hayes, P.C.

(57) ABSTRACT

Disclosed herein are methods and systems to generate and communicate interactive digital proofs of transaction. In one implementation, the method may include receiving an indication of a payment transaction between a merchant and a user and processing payment for the payment transaction. The payment processing system generates one or more interactive digital proofs of transaction including at least details of the payment transaction and availability of a vacancy or resource at the payee location. The user may respond via the interactive receipt.

20 Claims, 7 Drawing Sheets

(56) References Cited

U.S. PATENT DOCUMENTS

| | | | |
|---|---|---|---|
| 6,636,835 B2 | 10/2003 | Ragsdale-Elliott et al. | |
| 7,010,495 B1 | 3/2006 | Samra et al. | |
| 7,136,448 B1 | 11/2006 | Venkataperumal et al. | |
| 7,155,411 B1 | 12/2006 | Blinn et al. | |
| 7,233,843 B2 | 6/2007 | Budhraja et al. | |
| 7,406,436 B1 | 7/2008 | Reisman | |
| 7,552,087 B2 | 6/2009 | Schultz et al. | |
| 7,580,873 B1 | 8/2009 | Silver et al. | |
| 7,603,382 B2 | 10/2009 | Halt, Jr. | |
| D621,849 S | 8/2010 | Anzures et al. | |
| 7,810,729 B2 | 10/2010 | Morley, Jr. | |
| 7,818,809 B1 | 10/2010 | Sobel et al. | |
| 8,060,259 B2 | 11/2011 | Budhraja et al. | |
| 8,359,239 B1 | 1/2013 | Cook et al. | |
| 8,396,808 B2 | 3/2013 | Greenspan | |
| 8,401,710 B2 | 3/2013 | Budhraja et al. | |
| 8,434,682 B1 | 5/2013 | Argue et al. | |
| D683,755 S | 6/2013 | Phelan | |
| 8,548,929 B1* | 10/2013 | Goodwin | G06Q 10/06 705/321 |
| 8,571,916 B1 | 10/2013 | Bruce et al. | |
| 8,577,810 B1 | 11/2013 | Dalit et al. | |
| 8,579,203 B1 | 11/2013 | Lambeth et al. | |
| D695,306 S | 12/2013 | Gabouer et al. | |
| 8,602,296 B1 | 12/2013 | Velline et al. | |
| 8,645,014 B1 | 2/2014 | Kozlowski et al. | |
| 8,682,806 B1 | 3/2014 | Cate et al. | |
| 8,694,357 B2 | 4/2014 | Ting et al. | |
| 8,843,385 B2 | 9/2014 | Jurca et al. | |
| 8,892,462 B1 | 11/2014 | Borovsky et al. | |
| D720,765 S | 1/2015 | Xie et al. | |
| D720,766 S | 1/2015 | Mandal et al. | |
| 8,949,142 B1 | 2/2015 | Angrish et al. | |
| D725,133 S | 3/2015 | Smirin et al. | |
| D725,666 S | 3/2015 | Tseng et al. | |
| D732,059 S | 6/2015 | Andersen et al. | |
| 9,064,249 B1 | 6/2015 | Borovsky et al. | |
| D748,114 S | 1/2016 | Leyon | |
| D752,604 S | 3/2016 | Zhang | |
| D752,605 S | 3/2016 | Wang | |
| 9,384,497 B2 | 7/2016 | Calman et al. | |
| 9,542,681 B1 | 1/2017 | Borovsky et al. | |
| D786,906 S | 5/2017 | Andersen et al. | |
| 9,652,751 B2 | 5/2017 | Aaron et al. | |
| 9,721,251 B1 | 8/2017 | Jen et al. | |
| 9,799,021 B1 | 10/2017 | Lee | |
| 10,026,062 B1 | 7/2018 | Sasmaz et al. | |
| 10,217,092 B1 | 2/2019 | Maxwell et al. | |
| 10,313,480 B2 | 6/2019 | Greene et al. | |
| 10,430,797 B1 | 10/2019 | Borovsky et al. | |
| 10,650,440 B1 | 5/2020 | Yee et al. | |
| 10,726,399 B2 | 7/2020 | Aaron et al. | |
| 2001/0054003 A1 | 12/2001 | Chien et al. | |
| 2002/0023027 A1 | 2/2002 | Simonds | |
| 2002/0091646 A1 | 7/2002 | Lake et al. | |
| 2003/0061157 A1 | 3/2003 | Hirka et al. | |
| 2003/0115126 A1 | 6/2003 | Pitroda | |
| 2004/0030601 A1 | 2/2004 | Pond et al. | |
| 2004/0103065 A1 | 5/2004 | Kishen et al. | |
| 2004/0197489 A1 | 10/2004 | Heuser et al. | |
| 2004/0204990 A1 | 10/2004 | Lee et al. | |
| 2004/0219971 A1 | 11/2004 | Ciancio et al. | |
| 2004/0249746 A1* | 12/2004 | Horowitz | G06Q 20/10 705/39 |
| 2006/0229896 A1* | 10/2006 | Rosen | G06Q 10/1053 705/321 |
| 2007/0073619 A1 | 3/2007 | Smith | |
| 2007/0244766 A1 | 10/2007 | Goel | |
| 2008/0177624 A9 | 7/2008 | Dohse | |
| 2009/0033980 A1 | 2/2009 | Morris et al. | |
| 2009/0106105 A1* | 4/2009 | Lewis | G06Q 30/02 705/14.69 |
| 2009/0106138 A1 | 4/2009 | Smith et al. | |
| 2009/0159663 A1 | 6/2009 | Mullen et al. | |
| 2009/0204472 A1 | 8/2009 | Einhorn | |
| 2009/0240558 A1 | 9/2009 | Bandy et al. | |
| 2009/0271265 A1 | 10/2009 | Lay et al. | |
| 2009/0288012 A1 | 11/2009 | Hertel et al. | |
| 2009/0313132 A1 | 12/2009 | McKenna et al. | |
| 2009/0319421 A1 | 12/2009 | Mathis et al. | |
| 2010/0125495 A1 | 5/2010 | Smith et al. | |
| 2010/0185514 A1 | 7/2010 | Glazer et al. | |
| 2010/0217675 A1 | 8/2010 | Bookstaff | |
| 2010/0217699 A1 | 8/2010 | Bookstaff | |
| 2010/0280896 A1 | 11/2010 | Postrel | |
| 2010/0325048 A1 | 12/2010 | Carlson et al. | |
| 2011/0029416 A1 | 2/2011 | Greenspan | |
| 2011/0087550 A1 | 4/2011 | Fordyce, III et al. | |
| 2011/0106659 A1 | 5/2011 | Faith et al. | |
| 2011/0112897 A1 | 5/2011 | Tietzen et al. | |
| 2011/0145148 A1 | 6/2011 | Hammad | |
| 2011/0166931 A1* | 7/2011 | Joa | G06Q 30/02 705/14.53 |
| 2011/0196802 A1* | 8/2011 | Ellis | G06Q 10/00 705/321 |
| 2011/0295722 A1 | 12/2011 | Reisman | |
| 2011/0313867 A9 | 12/2011 | Silver | |
| 2012/0005076 A1 | 1/2012 | Dessert et al. | |
| 2012/0011072 A1 | 1/2012 | Lodolo | |
| 2012/0030044 A1 | 2/2012 | Hurst | |
| 2012/0066065 A1 | 3/2012 | Switzer | |
| 2012/0130785 A1 | 5/2012 | Postrel | |
| 2012/0150611 A1 | 6/2012 | Isaacson et al. | |
| 2012/0150742 A1 | 6/2012 | Poon et al. | |
| 2012/0191565 A1 | 7/2012 | Blank et al. | |
| 2012/0198279 A1 | 8/2012 | Schroeder | |
| 2012/0244885 A1 | 9/2012 | Hefetz | |
| 2012/0271725 A1 | 10/2012 | Cheng | |
| 2012/0290422 A1 | 11/2012 | Bhinder | |
| 2012/0290484 A1 | 11/2012 | Maher | |
| 2012/0290609 A1 | 11/2012 | Britt | |
| 2012/0316941 A1* | 12/2012 | Moshfeghi | G06Q 30/02 705/14.16 |
| 2013/0024307 A1 | 1/2013 | Fuerstenberg et al. | |
| 2013/0030879 A1 | 1/2013 | Munjal et al. | |
| 2013/0036065 A1 | 2/2013 | Chen et al. | |
| 2013/0073363 A1 | 3/2013 | Boal | |
| 2013/0103574 A1 | 4/2013 | Conrad et al. | |
| 2013/0112743 A1 | 5/2013 | Cavin et al. | |
| 2013/0124361 A1 | 5/2013 | Bryson | |
| 2013/0132140 A1 | 5/2013 | Amin et al. | |
| 2013/0132182 A1 | 5/2013 | Fung et al. | |
| 2013/0132246 A1 | 5/2013 | Amin et al. | |
| 2013/0132274 A1 | 5/2013 | Henderson et al. | |
| 2013/0132887 A1 | 5/2013 | Amin et al. | |
| 2013/0159172 A1 | 6/2013 | Kim | |
| 2013/0191194 A1 | 7/2013 | Shreibati et al. | |
| 2013/0218721 A1 | 8/2013 | Borhan et al. | |
| 2013/0236109 A1 | 9/2013 | Madden et al. | |
| 2013/0246207 A1 | 9/2013 | Novak et al. | |
| 2013/0246280 A1 | 9/2013 | Kirsch | |
| 2013/0246301 A1 | 9/2013 | Radhakrishnan et al. | |
| 2013/0290173 A1 | 10/2013 | Nemeroff | |
| 2013/0295882 A1 | 11/2013 | Zhao | |
| 2013/0317835 A1 | 11/2013 | Mathew | |
| 2013/0317886 A1 | 11/2013 | Kiran et al. | |
| 2014/0019236 A1 | 1/2014 | Argue et al. | |
| 2014/0025446 A1 | 1/2014 | Nagarajan et al. | |
| 2014/0025515 A1 | 1/2014 | Argue et al. | |
| 2014/0052484 A1 | 2/2014 | Bellamy | |
| 2014/0052613 A1 | 2/2014 | Tavakoli et al. | |
| 2014/0058861 A1 | 2/2014 | Argue et al. | |
| 2014/0059466 A1 | 2/2014 | Mairs et al. | |
| 2014/0074675 A1 | 3/2014 | Calman et al. | |
| 2014/0081854 A1 | 3/2014 | Sanchez et al. | |
| 2014/0100991 A1 | 4/2014 | Lenahan et al. | |
| 2014/0108245 A1 | 4/2014 | Drummond et al. | |
| 2014/0114781 A1 | 4/2014 | Watanabe | |
| 2014/0122345 A1 | 5/2014 | Argue et al. | |
| 2014/0129135 A1 | 5/2014 | Holden et al. | |
| 2014/0129302 A1 | 5/2014 | Amin et al. | |
| 2014/0129951 A1 | 5/2014 | Amin et al. | |
| 2014/0143157 A1 | 5/2014 | Jeffs et al. | |
| 2014/0149239 A1 | 5/2014 | Argue et al. | |

(56) References Cited

U.S. PATENT DOCUMENTS

| | | |
|---|---|---|
| 2014/0156508 A1 | 6/2014 | Argue et al. |
| 2014/0180805 A1 | 6/2014 | Argue et al. |
| 2014/0207680 A1 | 7/2014 | Rephlo |
| 2014/0244462 A1 | 8/2014 | Maenpaa et al. |
| 2014/0244489 A1 | 8/2014 | Kessler et al. |
| 2014/0257958 A1 | 9/2014 | Andrews |
| 2014/0344102 A1 | 11/2014 | Cooper |
| 2014/0351004 A1 | 11/2014 | Flett |
| 2015/0025983 A1 | 1/2015 | Cicerchi |
| 2015/0066699 A1 | 3/2015 | Fisher |
| 2015/0073989 A1 | 3/2015 | Green et al. |
| 2015/0095134 A1 | 4/2015 | Parker et al. |
| 2015/0134439 A1 | 5/2015 | Maxwell et al. |
| 2015/0142514 A1 | 5/2015 | Tutte |
| 2015/0142594 A1* | 5/2015 | Lutnick .......... G06Q 30/08 705/26.81 |
| 2015/0178712 A1 | 6/2015 | Angrish et al. |
| 2015/0304270 A1 | 10/2015 | Cook |
| 2015/0332223 A1 | 11/2015 | Aaron et al. |
| 2016/0328698 A1* | 11/2016 | Kumaraguruparan ...................... G06Q 20/227 |
| 2018/0032997 A1 | 2/2018 | Gordon et al. |
| 2018/0150807 A1 | 5/2018 | Aaron et al. |
| 2020/0034801 A1 | 1/2020 | Maxwell et al. |
| 2020/0327509 A1 | 10/2020 | Aaron et al. |

FOREIGN PATENT DOCUMENTS

| | | |
|---|---|---|
| CA | 2 930 186 A1 | 5/2015 |
| KR | 10-2006-9103089 A | 9/2006 |
| WO | 2011/014875 A1 | 2/2011 |
| WO | 2015/069389 A1 | 5/2015 |
| WO | 2015/179316 A1 | 11/2015 |

OTHER PUBLICATIONS

Notice of Allowance dated May 8, 2019, for U.S. Appl. No. 15/339,794, of Borovsky, A., et al., filed Oct. 31, 2016.
Final Office Action dated May 16, 2019, for U.S. Appl. No. 14/088,113 of Maxwell, D.W., et al., filed Nov. 22, 2013.
Non-Final Office Action dated May 31, 2019, for U.S. Appl. No. 15/582,300, of Aaron, P., et al., filed Apr. 28, 2017.
"Card Not Present Transaction," Wikipedia, published Mar. 4, 2014, Retrieved from the Internet URL: http://en.wikipedia.org/wiki/Card_not_present_transaction, on Jun. 6, 2014, pp. 1-2.
"Online Shopping," dated Nov. 2, 2014, Retrieved from the Internet URL: http://en.wikipedia.org/wiki/Online_shopping, on Nov. 10, 2014, pp. 1-12.
"Payment Gateway," Wikipedia, published May 30, 2014, Retrieved from the Internet URL: http://en.wikipedia.org/wiki/Pavment gateways, on Jun. 6, 2014, pp. 1-3.
"Uber—Android Apps on Google Play," Published on Nov. 10, 2014, Retrieved from the Internet URL: https://play.google.com/store/apps/details?id=com.ubercab&hl=en, on Nov. 12, 2014, pp. 1-2.
Goode, L., "Paying With Square's New Mobile-Payments App," All Things D, dated Apr. 30, 2012, Retrieved from the Internet URL: http://allthingsd.com/20120430/paying-with-squares-new-mobile-payments-app/, on Nov. 7, 2014, pp. 1-3.
Myres, L., "The Mac Security Blog: What is Multi-Factor Authentication, and How Will It Change in the Future?," Intego, dated Aug. 17, 2012, Retrieved from the Internet URL: http://www.intego.com/mac-security-blog/what-is-multi-factor-authentication-and-how-will-it-change-in-the-future/, on Nov. 11, 2014, pp. 1-4.
Wallen, J., "Five Top Apps for Managing Inventory," Tech Republic, dated Aug. 15, 2012, Retrieved from the Internet URL: http://www.techrepublic.com/blog/five-apps/five-top-apps-for-managing-inventory/, on Nov. 10, 2014, pp. 1-7.
Final Office Action dated Oct. 19, 2018, for U.S. Appl. No. 14/088,113, of Maxwell, D.W., et al., filed Nov. 22, 2013.
Notice of Allowance dated Oct. 30, 2018, for U.S. Appl. No. 14/088,141, of Maxwell, D.W., et al., filed Nov. 22, 2013.
Non-Final Office Action dated Nov. 14, 2018, for U.S. Appl. No. 15/339,794, of Borovsky, A., et al., filed Oct. 31, 2016.
Examiner Requisition for Canadian Patent Application No. 2,930,186, dated Nov. 28, 2018.
Non-Final Office Action dated Jan. 14, 2019, for U.S. Appl. No. 14/088,113, of Maxwell, D.W., et al., filed Nov. 22, 2013.
Final Office Action dated Feb. 26, 2019, for U.S. Appl. No. 14/220,064, of Maxwell, D.W., et al., filed Mar. 19, 2014.
Advisory Action dated Jul. 25, 2019, for U.S. Appl. No. 14/088,113, of Maxwell, D.W , et al., filed Nov. 22, 2013.
Non-Final Office Action dated Sep. 17, 2019, for U.S. Appl. No. 14/220,064, of Maxwell, D.W., et al., filed Mar. 19, 2014.
Final Office Action dated Oct. 2, 2019, for U.S. Appl. No. 15/582,300, of Aaron, P. et al., filed Apr. 28, 2017.
Examination Report No. 1 for Australian Patent Application No. 2018205104, dated Sep. 10, 2019.
Bruene, J., "Capital One Add Rewards to Mobile App, Includes Ability to Redeem from PREVIOUS Travel," netbanker.com, published Apr. 20, 2012, Retrieved from the Internet URL: https://web.archive.org/web/20120425043052/http://www.netbanker.com/201 2/04/capital_one_add_rewards_to_mobile_app_includes_ability_to_redeem_for_previous_travel.html, on Aug. 10, 2018, pp. 1-2.
Joy, "Square Wallet- an iOS App updated to send gift cards," Top Apps, dated Apr. 6, 2013, Retrieved from the Internet URL: http://www.topapps.net/apple-ios/square-wallet-an-ios-app-updated-to-send-gift-cards.html/, pp. 1-3.
Konrad, J., "A Traveler's Review of the Capital One Venture Rewards Card," Runaway truck, dated on Jul. 11, 2013, Retrieved from the Internet URL: http://web.archive.org/web/20130923122057/http://queenofsubtle.com/rt/travel-tips/a-travelers-review-of-the-capital-one-venture-rewards-card, pp. 1-2.
Non-Final Office Action dated Apr. 4, 2014, for U.S. Appl. No. 14/172,842, of Borovsky, A., et al., filed Feb. 4, 2014.
Notice of Allowance dated Aug. 1, 2014, for U.S. Appl. No. 14/172,842, of Borovsky, A., et al., filed Feb. 4, 2014.
Notice of Allowance dated Feb. 20, 2015, for U.S. Appl. No. 14/513,076, of Borovsky, A., et al., filed Oct. 13, 2014.
Non-Final Office Action dated Mar. 3, 2015, for U.S. Appl. No. 14/506,534, of Aaron, P., et al., filed Oct. 3, 2014.
Non-Final Office Action dated Mar. 19, 2015, for U.S. Appl. No. 14/329,638, of Aaron, P., et al., filed Jul. 11, 2014.
Non-Final Office Action dated Jun. 11, 2015, for U.S. Appl. No. 14/692,655, of Borovsky, A., et al., filed Apr. 21, 2015.
Final Office Action dated Jun. 24, 2015, for U.S. Appl. No. 14/506,534, of Aaron, P., et al., filed Oct. 3, 2014.
Non-Final Office Action dated Oct. 6, 2015, for U.S. Appl. No. 14/329,658, of Aaron, P., et al., filed Jul. 11, 2014.
Final Office Action dated Oct. 16, 2015, for U.S. Appl. No. 14/692,655, of Borovsky, A., et al., filed Apr. 21, 2015.
Final Office Action dated Oct. 21, 2015, for U.S. Appl. No. 14/329,638, of Aaron, P., et al., filed Jul. 11, 2014.
Advisory Action dated Dec. 30, 2015, for U.S. Appl. No. 14/692,655, of Borovsky, A., et al., filed Apr. 21, 2015.
Non-Final Office Action dated Mar. 14, 2016, for U.S. Appl. No. 14/692,655, of Borovsky, A., et al., filed Apr. 21, 2015.
Non-Final Office Action dated Apr. 8, 2016, for U.S. Appl. No. 14/187,104, of Lee, R., filed Feb. 21, 2014.
Non-Final Office Action dated May 17, 2016, for U.S. Appl. No. 29/530,241, of Andersen, R., et al., filed Jun. 15, 2015.
Final Office Action dated May 20, 2016, for U.S. Appl. No. 14/329,658, of Aaron, P., et al., filed Jul. 11, 2014.
Non-Final Office Action dated Jun. 7, 2016, for U.S. Appl. No. 14/088,113, of Maxwell, D.W., et al., filed Nov. 22, 2013.
Non-Final Office Action dated Jun. 8, 2016, for U.S. Appl. No. 14/088,141, of Maxwell, D.W., et al., filed Nov. 22, 2013.
Non-Final Office Action dated Jul. 21, 2016, for U.S. Appl. No. 14/329,638, of Aaron, P., et al., filed Jul. 11, 2014.
Notice of Allowance dated Sep. 13, 2016, for U.S. Appl. No. 14/692,655, of Borovsky, A., et al., filed Apr. 21, 2015.
Advisory Action dated Sep. 29, 2016, for U.S. Appl. No. 14/329,658, of Aaron, P., et al., filed Jul. 11, 2014.

(56) References Cited

OTHER PUBLICATIONS

Final Office Action dated Oct. 5, 2016, for Design U.S. Appl. No. 29/530,241, of Andersen, R., et al., filed Jun. 15, 2015.
Final Office Action dated Nov. 29, 2016, for U.S. Appl. No. 14/088,113, of Maxwell, D.W., et al., filed Nov. 22, 2013.
Non-Final Office Action dated Dec. 7, 2016, for U.S. Appl. No. 14/187,104, of Lee, R., filed Feb. 21, 2014.
Final Office Action dated Dec. 12, 2016, for U.S. Appl. No. 14/088,141, of Maxwell, D.W., et al., filed Nov. 22, 2013.
Examination Report No. 1 for Australian Patent Application No. 2014347192, dated Dec. 15, 2016.
Notice of Allowance dated Jan. 3, 2017, for Design U.S. Appl. No. 29/530,241, of Andersen, R., et al., filed Jun. 15, 2015.
Notice of Allowance dated Jan. 13, 2017, for U.S. Appl. No. 14/329,658, of Aaron, P., et al., filed Jul. 11, 2014.
Final Office Action dated Jan. 27, 2017, for U.S. Appl. No. 14/329,638, of Aaron, P., et al., filed Jul. 11, 2014.
Examiner Requisition for Canadian Patent Application No. 2,930,186, dated Jan. 30, 2017.
Notice of Acceptance for Australian Patent Application No. 2014347192, dated Feb. 16, 2017.
Corrected Notice of Allowance dated Feb. 27, 2017, for U.S. Appl. No. 14/329,658, of Aaron, P., et al., filed Jul. 11, 2014.
Non-Final Office Action dated Mar. 1, 2017, for U.S. Appl. No. 14/220,064, of Maxwell, D.W., et al., filed Mar. 19, 2014.
Non-Final Office Action dated Jun. 19, 2017, for U.S. Appl. No. 14/730,860, of Sasmaz, Y., et al., filed Jun. 4, 2015.
Notice of Allowance dated Jun. 21, 2017, for U.S. Appl. No. 14/187,104, of Lee, R., filed Feb. 21, 2014.
Examination Report No. 1 for Australian Patent Application No. 2015264426, dated Jul. 11, 2017.
Final Office Action dated Sep. 20, 2017, for U.S. Appl. No. 14/220,064, of Maxwell, D.W., et al., filed Mar. 19, 2014.
Final Office Action dated Nov. 17, 2017, for U.S. Appl. No. 14/730,860, of Sasmaz, Y., et al., filed Jun. 4, 2015.
Examiner Requisition for Canadian Patent Application No. 2,930,186, dated Jan. 11, 2018.
Notice of Allowance dated Mar. 15, 2018, for U.S. Appl. No. 14/730,860, of Sasmaz, Y., et al., filed Jun. 4, 2015.
Non-Final Office Action dated Apr. 5, 2018, for U.S. Appl. No. 14/088,113, of Maxwell, D.W., et al., filed Nov. 22, 2013.
Non-Final Office Action dated Apr. 18, 2018, for U.S. Appl. No. 14/088,141, of Maxwell, D.W., et al., filed Nov. 22, 2013.
Examination Report No. 2 for Australian Patent Application No. 2015264426, dated Jun. 20, 2018.
Non-Final Office Action dated Aug. 3, 2018, for U.S. Appl. No. 14/220,064, of Maxwell, D.W., et al., filed Mar. 19, 2014.
International Search Report and Written Opinion for International Application No. PCT/US2014/058398, dated Dec. 24, 2014.
International Search Report and Written Opinion for International Application No. PCT/US2015/031423, dated Aug. 13, 2015.
Examination Report No. 2 for Australian Patent Application No. 2018205104, dated Dec. 10, 2019.
Notice of Allowance for Canadian Patent Application No. 2,930,186 dated Jan. 16, 2020.
Final Office Action dated Mar. 13, 2020, for U.S. Appl. No. 14/220,064, of Maxwell, D.W , et al., filed Mar. 19, 2014.
Notice of Allowance dated Mar. 18, 2020, for U.S. Appl. No. 15/582,300, of Aaron, P. et al., filed Apr. 28, 2017.
Examination Report No. 3 for Australian Patent Application No. 2018205104, dated Sep. 7, 2020.
Examination Report No. 3 for Australian Patent Application No. 2020230303, dated Jul. 30, 2022.
Final Office Action (Letter Restarting Period for Response) dated Aug. 22, 2022, for U.S. Appl. No. 16/913,277 of Aaron, P., et al., filed Jun. 26, 2020.
Non-Final Office Action dated Oct. 27, 2022, for U.S. Appl. No. 16/588,997, of Maxwell, D.W., et al., filed Sep. 30, 2019.
Examination Report No. 1 for Australian Patent Application No. 2020230303, dated Sep. 2, 2021.
Non-Final Office Action dated Jan. 21, 2022, for U.S. Appl. No. 16/913,277, of Aaron, P., et al., filed Jun. 26, 2020.
Examination Report No. 2 for Australian Patent Application No. 2020230303, dated Mar. 17, 2022.
Non-Final Office Action dated Jun. 9, 2022, for U.S. Appl. No. 16/588,997, of Maxwell, D.W., et al., filed Sep. 30, 2019.
Final Office Action dated Jun. 24, 2022, for U.S. Appl. No. 16/913,277, of Aaron, P., et al., filed Jun. 26, 2020.

\* cited by examiner

US 11,676,108 B1

APPARATUSES, METHODS, AND SYSTEMS FOR GENERATING INTERACTIVE DIGITAL RECEIPTS

RELATED APPLICATIONS

This application claims priority to and is a continuation of U.S. patent application Ser. No. 14/730,860, filed on Jun. 4, 2015, the entire contents of which are incorporated herein by reference.

TECHNICAL FIELD

Customers are generally provided with paper receipts of the transaction at the point-of-sale (POS) terminal as proof of purchase of goods/services. The receipt generally includes an itemization of the product or service and a total net cost of all the products and/or services. The paper receipt serves as a proof of the purchase for the customer.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
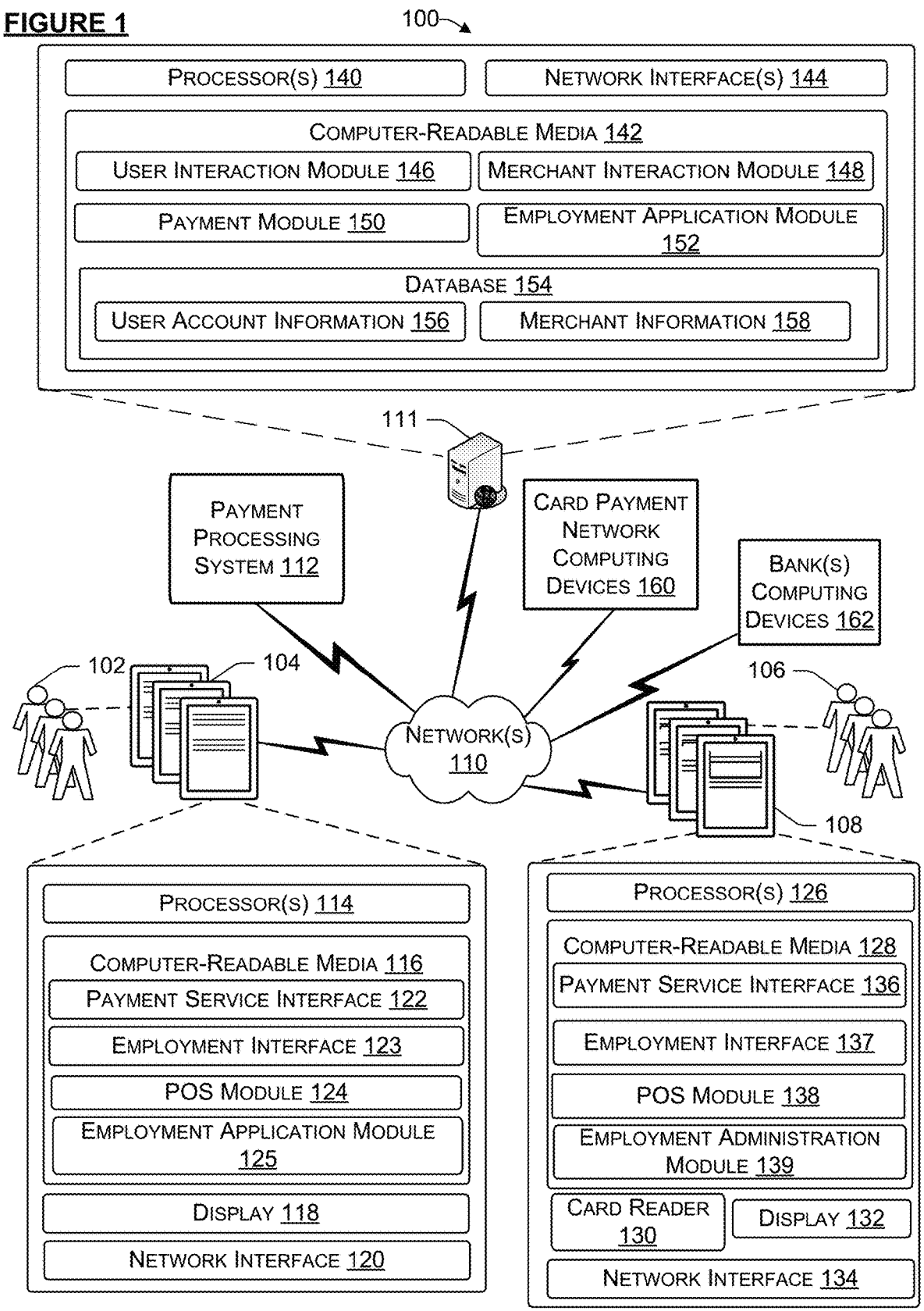
FIG. 1 is a network diagram illustrating an exemplary environment for processing transactions and generating receipts having transaction information and information pertaining to at least one employment vacancy, according to an embodiment of the present subject matter.

Embodiments of "Apparatuses, methods, and systems for generating interactive digital receipts" are described herein. Some embodiments provide methods and systems for generating interactive digital receipts in response to a financial payment transaction ("transaction") between a merchant and one or more customers. In some embodiments, the interactive digital receipts are configured to include job opportunities or employment vacancies in transaction receipts thereby identifying customers or contacts of customers as potential candidates while or after a transaction is performed. In one implementation, the employment vacancy may be related to either the merchant with whom the customer is interacting or any other merchant. Furthermore, the employment opportunity may be extracted from amongst available opportunities based on customer's or contacts' current job, job history, or professional qualifications, among various other factors.

In one implementation, a customer interacts with a merchant via a point of sale (POS) terminal connected to a payment processing system. In another implementation, a customer, who is at a first location, may use a customer device to place an order with a merchant for delivery of an item to a second location that is remote or otherwise different from the first location. In response to an indication of transaction such as a credit card swipe, entry of debit card information or any other kind of payment card, a receipt having transaction and employment information (such as job vacancies) may be generated and displayed to the merchant and/or customer at the POS terminal or on the customer device. Such a receipt may be designed to interact with the customer, for example, by allowing customers to follow hyperlinks, embedded webpages, enter information in customized fields for further processing, or to enabled a user to share on social networks or other communication networks, submit applications for preferred employment vacancies, etc. In one implementation, the merchant chooses to publish employment vacancies on the same receipt on which the transaction information is published.

In some embodiments, the payment processing system can receive transaction information from a variety of entities involved in processing the payment transaction. For example, the payment processing system may receive transaction information from the merchant, the acquirer or the issuer. In order to identify the financial accounts that require transaction information collection, the entity supplying the transaction information (e.g., a card payment network) can maintain a database including information of financial accounts having a particular classification (e.g., accounts that are known to be associated with the payment processing system). When the entity determines that a requested financial transaction relates to a financial account so classified in the database, the entity transmits the transaction information to the payment service system in real-time or near real-time, so that the payment processing system can generate an interactive digital transaction receipt for the customer.

Some embodiments may also include an employment database associated with a merchant server, where the employment database may include listing of one or more available jobs, for example at a merchant's business location. In some embodiments, the employment database or instances of the database may be present locally within the merchant's POS terminal.

The payment processing system can receive messages indicating that a customer has chosen to enroll to a job notification service in the interactive digital receipt. Some embodiments may allow for the employment vacancies to be presented to the customer based on his or her professional history, current jobs, job preferences, etc., retrieved from the job database or a database within the customer's device. The employment vacancies may also be configured to be directed to one or more contacts of the customer, e.g., contacts obtained from social networks, such as Facebook™ LinkedIn™, electronic mail, contacts book on the mobile device, etc. The professional details of the customer and/or contacts of the customer may be derived directly by requesting customer inputs through a customized web interface. In another example, the professional details may be obtained from other sources, such as searches on the Internet, parsing a resume, or establishing communication links with third-party databases.

In one embodiment, the payment processing system can receive the current or desired job specifications from, for example, the customer's device, associated devices, or Internet search, in real-time or near real-time. The payment service system can aggregate the transaction information with the employment vacancies on one or more receipts and display to the customers on their respective customer devices.

For discussion purposes, some example implementations are described in the environment of enabling merchants to focus on a specific set of customers, however, the specific set may be randomly selected and all of the merchant's customers may receive the same employment vacancy in their receipts irrespective of whether the employment vacancy is relevant to them or not. Implementations herein are not limited to the particular examples provided, and may be extended to other service environments, other system architectures, other types of goods, other conditions, and so forth, as will be apparent to those of skill in the art in light of the disclosure herein.

Embodiments of the methods and systems described herein can offer new, efficient, and intelligent channels for an employer to penetrate the job market and connect with potential candidates, in most cases directly and without involving a third-party, such as agents or recruiters. Furthermore, the disclosed methods and systems enables merchants to find candidates who are most suitable to the job and opens up opportunities for merchants to conduct or schedule interviews at the time of transaction or by integrating transactions details with potential job details in one interactive job receipt. The disclosed methods and systems also increases visibility of job seekers to potential employers by providing a channel for job seekers to connect and interact with employers face to face. The disclosed methods and systems can operate in both real-time and offline modes. Embodiments of the present subject matter are configured to operate regardless of the kind of mobile device, web applications, mobile applications, POS topologies, payment cards, computer networks, and environments.

Embodiments of the present subject matter may find various applications in, e.g., coin and non-coin based point of sale (POS) systems where receipts are generally provided to itemize purchases. Furthermore, transactions on such POS systems may be either direct or remote. Certain embodiments of the present subject matter may be configured for use in standalone devices (e.g., PDAs, smartphones, laptops, PCs and/or the like). Other embodiments may be adapted for use in a first device (e.g., mobile phone, and/or the like), which may be connected to a second device (e.g., tablet computer and/or the like) via any type of connection (e.g., Bluetooth, USB, Wi-Fi, serial, parallel, RF, infrared, optical and/or the like) to exchange various types of data (e.g., raw signals, processed data, recorded data/signals and/or the like). In such embodiments, all or part of the data processing may happen on the first device, in other embodiments all or part of the data processing may happen on the second device. In some embodiments there maybe more than two devices connected and performing different functions and the connection between devices and processing may happen in stages at different times on different devices. Certain embodiments may be configured to work with various types of processors (e.g., ARM, Raspberry Pi and/or the like).

While aspects of the described subject matter can be implemented in any number of different systems, circuitries, environments, and/or configurations, the embodiments are described in the context of the following exemplary system(s) and configuration(s). The descriptions and details of well-known components are omitted for simplicity of the description.

FIG. 1 is a network diagram illustrating an exemplary environment 100 for one or more merchants to process at least one payment transaction for goods and/or services purchased or used by one or more user(s), to facilitate the merchants to upload at least one employment vacancy within an employment database via a communication device, and associate the employment vacancy with the payment transaction of the user. The merchant may thus serve as a merchant, a recruiter, and a potential employer providing goods/services while determining, through one or more methods and systems described herein, which customers and contacts of customers can be potential employees. As an example, the users and/or contacts of the users may be provided with details of the payment transaction and employment vacancy through an interactive digital receipt.

In one implementation, the environment 100 may include: one or more user(s) 102 (alternatively referred to as customers, candidates, potential employees, and/or employees); one or more user device(s) 104 associated with the user(s) 102; one or more merchants 106 (alternatively referred to as merchants, potential employers, and/or employers); one or more merchant devices 108 associated with the one or more merchants 106; one or more network(s) 110; an employment management server 111; and a payment processing system 112. In one implementation, the exemplary network 110 facilitates processing and fulfillment of a transaction between a merchant 106 and a customer 102, for example, using the payment processing system 112. Additionally or alternatively, the network 110 is configured to facilitate employment management and administration processes, including but not limited to, uploading employment vacancies, modifying employment vacancies, setting employment preferences, generating employment applications, receiving employment applications, determining a best candidate from amongst a plurality of employment applications, and so on, using the user device 104, the merchant device 108, the payment processing system 112, the employment application server 111, or a combination thereof. According to some implementations, the user devices 104 and the merchant devices 108 work on a communication protocol as defined by a network 110 with which the device 104 or device 108 is coupled.

In some implementations, one of the users 102 may operate a user device 104 to perform various functions associated with the user device 104. In various implementations, the user device 104 may include one or more processor(s) 114, computer-readable media 116, a display 118, and a network interface 120. The computer-readable media 116 may store a payment service interface 122, an employment interface 123, a point of sale (POS) module 124, and an employment application module 125.

A user of the user(s) 102 may utilize the user device(s) 104, and particularly the payment service interface 122 thereof, to interact with the payment processing system 112 via the network interface 120 to establish a user account with the payment service of the payment processing system 112. In addition, a user of the user(s) 102 may utilize POS module 124 of the user device 104 to interface with the POS module 138 of the merchant device(s) 108, e.g., as part of a transaction using the payment service of the payment processing system 112. For example, the user device 104 may communicate via the network interface 120 with the merchant device(s) 108 through the network interface 134. As an example of such a payment operation, the POS module 138 of the merchant device 108 may communicate with the POS module 124 of the user device 104 to obtain information for processing a payment from the user 102 to the merchant 106 using the payment service of the payment processing system 112.

In another example, a user 102 may utilize the employment interface 123 to interact with the employment management server 111 via the network interface 144 to store and/or modify past or current employment data and submit one or more employment applications for employment vacancies stored thereon. In addition, the user 102 may utilize employment application module 125 of the user device 104 to interface with the employment application module 152 to facilitate employment management processes. The definition of user 102, in such a case, can be configured to include the customer making a transaction, friend, relative, or any other professional or personal contact.

In some implementations, the user device 104 may be any type of device that is capable of interacting with the merchant device(s) 108, the employment management server 111, and/or the payment processing system 112. For instance, the user device 104 may include a personal computer, a laptop computer, a cellular telephone, a PDA, a tablet device, or any other device. The user device 104 shown in FIG. 1 is only one example of a user device 104 and is not intended to suggest any limitation as to the scope of use or functionality of any user device 104 utilized to perform the processes and/or procedures described herein. For example, the user device 104 may include various other applications or modules, such as a module for a user dashboard to enable the user to create an employee profile, create a transaction profile, control information in the profiles, toggle between profiles based on whether transaction is being made or application is being filed for an employment vacancy, set user preferences, and so forth.

The processor(s) 114 of the user device 104 may execute one or more modules and/or processes to cause the user device 104 to perform a variety of functions, as set forth above and explained in further detail in the following disclosure. In some implementations, the processor(s) 114 may include a central processing unit (CPU), a graphics processing unit (GPU), both CPU and GPU, or other processing units or components known in the art. Additionally, each of the processor(s) 114 may possess its own local memory, which also may store program modules, program data, and/or one or more operating systems.

Depending on the exact configuration and type of the user device 104, the computer-readable media 116 may include volatile memory (such as RAM), nonvolatile memory (such as ROM, flash memory, miniature hard drive, memory card, or the like), or some combination thereof.

In various implementations, the user device 104 may also have input device(s) such as a keyboard, a mouse, a pen, a voice input device, a touch input device, etc. The user device 104 may also include the display 118 and other output device(s), such as speakers, a printer, etc. More particularly, the display 118 of the user device 104 may include any type of display 118 known in the art that is configured to present (e.g., display) information to the users 102. The user 102 may utilize the foregoing features to interact with merchant device(s) 108 or the employment management server 111, and/or payment processing system 112 via the network(s) 110.

Similar to the users 102, the merchant(s) 106 may operate the merchant device(s) 108, which may include one or more processor(s) 126, computer-readable media 128, a card reader 130, a display 132, and a network interface 134. The computer-readable media 126 may store a payment service interface 136, an employment interface 137, a POS module 138, and an employment administration module 139.

In various implementations, the one or more merchants 106 may be any individual, entity, or machine that offers products, services or the like according to the examples herein. Moreover, each of the merchants 106 may be associated with one or more merchant devices 108, which may be the same as, similar to, or different from the user devices 104. The merchant devices 108 may include any number of components such as the one or more processor(s) 126, the computer-readable media 128, the card reader 130, the display 132, and/or network interface 134. The merchants 106 may utilize the merchant devices 108 to interact with user device 104, the employment management server 111, and/or payment processing system 112 in any manner. For instance, the merchant devices 108 may be used to access an interface associated with the payment processing system 112. In another example, the merchant devices 108 may be used to access an interface associated with the employment management server 111 (e.g., the employment interface 137).

Continuing the above example, a merchant device 108 may utilize information obtained from interacting with the POS module 124 of the user device 104 to execute the payment from the user 102 to the merchant 106 through the payment service of the payment processing system 112. Further, the POS module 138 may control the operation of the card reader 130 to read payment information from credit cards, debit cards, gift cards and the like. The POS module 138 may then utilize the information in operations for allocating portions of a transaction cost between a plurality of payment instruments. Moreover, the POS module 138 may operate to interact with card payment network computing devices(s) 160 and/or bank(s) computing device(s) 162 to execute payments from the user 102 to the merchant 106. In one implementation, such an interaction can be facilitated by the payment processing system 112. Furthermore, the employment administration module 139 may operate to interact with the employment management server 111 to receive input from the merchant 106 in the form of an employment vacancy, for example, at any of merchant's businesses. The merchant 106 may create and/or modify existing employment vacancies and store such changes either locally or in the database 154 of the employment management server 111. Other inputs may include a query to search the database 154 of the employment management server 111 for one or more employment applications from users 102, a contact of the user 102, etc. In other implementations, an entity not determined or registered as a merchant 106 may enter an employment vacancy through a respective employment administration module 139. In some implementations, a separate portal, for example, a portal hosted by a third-party, may be used by the merchant 106 or another entity for entering employment vacancies into the employment management server 111.

While the user devices 104 and merchant devices 108 are shown as including different modules, this is merely for ease of illustration and not intended as limiting. In various implementations, the user devices 104 and merchant devices 108 may be identical, similar or distinct. Moreover, the modules shown and described for the user devices 104 and merchant devices 108 may be implemented as more modules or as fewer modules and functions described for the modules may be redistributed depending on the details of the implementation. Additionally, in some implementation, there may be thousands, hundreds of thousands, or more, of the user devices 104 and the merchant devices 108. Further, in some implementations, the user devices 104 and/or merchant devices 108 may vary from device to device. In general, the user devices 104 and the merchant devices 108 can each be any appropriate device operable to send and receive requests, messages, electronic messages, text messages, alerts, notifications, pop-up messages, push notifications, or other types of information over the one or more networks 110 or directly to each other.

In some implementations, the network(s) 110 may be any type of network known in the art, such as a local area network or a wide area network, such as the Internet, and may include a wireless network, such as a cellular network, a cloud network, a local wireless network, such as Wi-Fi and/or close-range wireless communications, such as Bluetooth® and Bluetooth® low energy, near field communications (NFC), a wired network, or any other such network, or any combination thereof. Accordingly, the one or more networks 110 may include both wired and/or wireless communication technologies, including Bluetooth®, Bluetooth® low energy, Wi-Fi and cellular communication technologies, cloud computing technologies, as well as wired or fiber optic technologies. Components used for such communications can depend at least in part upon the type of network, the environment selected, or both. Protocols for communicating over such networks are well known and are not discussed herein in detail. Consequently, the user devices 104, the merchant devices 108, the employment management server 111, and the payment processing system 112 may be communicatively coupled to the network 110 in any manner, such as by a wired or wireless connection. The network 110 may also facilitate communication between the user devices 104, the merchant devices 108, the employment management server 111, and/or payment processing system 112. In turn, the network interfaces 120, 134 and 144 of the user devices 104, the merchant devices 108, the employment management server 111, and the payment processing system 112, etc., may be any network interface hardware components that may allow user devices 104, the merchant devices 108, the employment management server 111, and the payment processing system 112 to communicate over the network 110. For example, in a particular implementation, the network interfaces 120 and 134 of the user devices 104 and merchant devices 108 may include NFC capabilities for performing the communications there between involved in POS operations and employment management operations.

The payment processing system 112 along with the employment management server 111 may facilitate generation of one or more interactive digital receipts in response to a transaction with the customer to provide: (a) itemized level details of the transaction: and (b) information related to one or more employment vacancies, which may be retrieved from the employment management server 111.

To this end, the employment management server 111 may include one or more processor(s) 140, computer-readable media 142 and a network interface 144. The computer readable media 142 may store a user interaction module 146, a merchant interaction module 148, a payment module 150, an employment application module 152 and an employment database 154 ("database") having user account information 156 and merchant information 158.

The payment processing system 112 may include one or more processor(s), computer-readable media, and a network interface (not shown in this figure). The computer readable media may store a receipt generation module, an integration module, and a database (not shown in this figure). The payment processing system 112 may also include modules similar to employment management module 111, such as a user interaction module 146, a merchant interaction module 148, a payment module 150, an employment application module 152, and an employment database 154 having user account information 156 and merchant information 158. Even though the description shows the employment management server 111 and the payment processing system 112 as two separate entities, in some implementations, the two can be combined into a single entity.

As mentioned before, the employment management server 111 may include the one or more processor(s) 140, the computer-readable media 142 and network interface 144. The employment management server 111 may also include additional components not listed above that may perform any function associated with the employment management server 111. In various implementations, the employment management server 111 may be any type of computing device, such as a network-accessible server, and may be one of multiple servers included in a server cluster or server farm. In other implementations, the processor(s) 140 and the computer-readable media 142 of the employment management server 111 may be the same as, similar to, or different from the processor(s) 114 and the computer-readable media 116, respectively, of the user device(s) 104. As discussed above, the computer-readable media 142 may store the user interaction module 146, the merchant interaction module 148, the payment module 150, the employment application module 152, and the database 154 (also referred to as the job/employment database 154). The database 154 may store various information including user account information 156 and merchant information 158. As shown, the database 154 may be shared among the users 102 and/or merchants 106 through the network 110. In another example, an instance of the database 154 may be locally present within each of the merchant's communication device 108.

In some implementations, the employment management server 111 may be associated with a payment processing system 112. In other implementations, the employment management server 111 may support payment processing functionalities. To this end, the database 154 may include additional tables and/or data structures to store payment processing related data. The payment module 150 on the employment management server 111 or within the payment processing system 112 may utilize information from the database 154, such as the user account information 156 and merchant information 158, to provide handling of payments between merchants and users. In some implementations, user account information 156 may include information regarding electronic payment accounts of the customers (e.g., users 102).

As mentioned above, the payment processing system 112 may handle payments between merchants and users. When paying for a transaction, a user 102 can provide the amount of payment that is due to a merchant 106 using cash, check, a payment card (any card with magnetic stripe (such as a debit card or credit card), a card conforming with the Europay, MasterCard, and Visa (EMV) standard, a prepaid card, a gift card having cash value, a card with loyalty points such as an airline card, etc.), NFC, or by electronic payment through a payment service of the payment processing system 112. The merchant 106 can interact with the merchant device 108 to process the transaction. During point-of-sale (POS) transactions, the merchant device 108 can determine and send data describing the transactions, including, for example, services provided, item(s) being purchased, the amount of the services or item(s), customer information, and so forth.

In some implementations, the payment processing system 112 enables card-less payments, i.e., electronic payments, for transactions between the users 102 and the merchants 106 based on interaction of the user 102 with the user device 104 and interaction of the merchant 106 with the merchant device 108. Accordingly, in some examples, a card-less payment transaction may include a transaction conducted between a user 102 and a merchant 106 at a POS location during which an electronic payment account of the user 102 is charged without the user 102 having to physically present a payment card to the merchant 106 at the POS location. Consequently, the merchant 106 need not receive any details about the financial account of the user 102 for the transaction to be processed. As one example, the electronic payment may be charged to a credit card issuer or credit card number that the user 102 provided when signing up with the service of the computing devices 112 for an electronic payment account. As another example, the user 102 may have a quantity of money pre-paid in an account maintained for use in making the electronic payments. Other variations will also be apparent to those of skill in the art having the benefit of the disclosure herein.

Before conducting an electronic payment transaction, the user 102 creates a user account with the service of the payment processing system 112. The user 102 can create the user account, for example, by interacting with an application of the user device 104 that is configured to perform electronic payment transactions and that may execute on the user device 104 (e.g., the payment service interface 122). When creating an electronic payment account with the service of the computing devices 112, the user 102 may provide an image including the picture of the face of the user, data describing a financial account of the user 102 (e.g., a credit card number, expiration date), contact information, and/or a billing address. Optionally, the user 102 may also provide information related to his or her employment history, including past and current jobs. This information may also be electronically captured during an interaction between the merchant 106 and the user 102. Such user information can be securely stored by the employment management server 111, for example, in the user account information 156 in the database 154, and/or the payment processing system 112. Further, the user account information, such as user account information 156, may be created for each user 102, which may include information about the user and transactions conducted by the user 102.

To accept electronic payments for POS transactions, the merchant 106 may create a merchant account with the service of the employment management server 111 or the payment processing system 112 by providing information describing the merchant including, for example, a merchant name, contact information, e.g., telephone numbers, the merchant's geographic location address, and one or more financial accounts to which funds collected from users will be deposited. Such merchant information 158 can be securely stored by the service, for example, in the database 154 along with the user account information 156. Further, a merchant profile may be created for each merchant 106, which may include information about the merchant 106 and transactions conducted by the merchant 106.

The payment processing system 112 may be configured to enable electronic payments for transactions. To this end, the payment processing system 112 can include one or more servers that are configured to perform secure electronic financial transactions, e.g., electronic payments for transactions between a user and a merchant, for example, through data communicated between the user device 104 and the merchant device 108. Generally, when a user 102 and a merchant 106 enter into an electronic payment transaction, the transaction is processed by electronically transferring funds from a financial account associated with the user account to a financial account associated with the merchant account. Alternatively, the user may have a balance of funds maintained by the payment service as part of the user account which may be used in transactions.

The payment processing system 112 may be configured to interact with a local or external module, such as the payment module 150, which can send and receive data to and from the user device 104 and the merchant device 108. For example, the payment module 150 can be configured to send information describing merchants to an application on the user device 104 using, for example, the information stored in the employment database 154. For example, the payment module 150 can communicate data describing merchants 106 that are within a threshold geographic distance from a geographic location of the user device 104. The data describing the merchants 106 can include, for example, a merchant name, geographic location, contact information, an electronic catalog, e.g., a menu that describes items that are available from the merchant 106, and a list of employment vacancies at that merchant's location.

In some embodiments, the payment module 150 is configured to determine whether a geographic location of the user device 104 is within a threshold geographic distance from a geographic location of the merchant device 108. The payment module 150 can determine a geographic location of the user device 104 using, for example, geo-location data provided by the user device 104. Similarly, the payment module 150 can determine a geographic location of the merchant device 108 using, for example, geo-location data provided by the merchant device 108 or using a geographic address, e.g., street address, provided by the merchant. Depending on the implementation, the threshold geographic distance can be specified by the payment module 150, by the user 102 or by the merchant 106.

Determining whether the user device 104 is within a threshold geographic distance of the merchant device 108 can be accomplished in different ways including, for example, determining whether the user device 104 is within a threshold geographic radius of the merchant device 108, determining whether the user device 104 is within a particular geo-fence, or determining whether the user device 104 can communicate with the merchant device 108 using a specified wireless technology, e.g., Bluetooth® or Bluetooth® low energy (BLE). In some embodiments, the payment module 150 restricts electronic payment transactions between the user 102 and the merchant 106 to situations where the geographic location of the user device 104 is within a threshold geographic distance from a geographic location of the merchant device 108. Knowledge of user's geographic location may be used for focused advertising of an employment vacancy, for example, the user 102 may be suggested one or more employment vacancies based on a determination of user's employment profile and a matching operation performed with merchant's employment vacancies within a predefined geographical area. In one example, on determining that a user 102 is a barista, the environment 100 may be configured to present employment vacancies at coffee stores within a 10 mile radius from location of the user 102.

The payment processing system 112 can also be configured to communicate with one or more computing devices 160 of a card payment network (e.g., MasterCard®, VISA®) over the one or more networks 110 to conduct financial transactions electronically.

The payment processing system 112 can also communicate with one or more bank computing devices 162 of one or more banks over the one or more networks 110. For example, the payment processing system 112 may communicate with an acquiring bank, and/or an issuing bank, and/or a bank maintaining user accounts for electronic payments. An acquiring bank may be a registered member of a card association (e.g., Visa®, MasterCard®). An issuing bank may issue payment cards to users, and may pay acquiring banks for purchases made by cardholders to which the issuing bank has issued a payment card.

Accordingly, in some examples, the computing device(s) of an acquiring bank may be included in the card payment network and may communicate with the computing devices of a card-issuing bank to obtain payment. Further, in some examples, the user may use a debit card or gift card instead of a credit card, in which case, the bank computing device(s) 162 of a bank or other institution corresponding to the debit card or gift card may receive communications regarding a transaction in which the user is participating. Additionally, there may be computing devices of other financial institutions involved in some types of transactions or in alternative system architectures, and thus, the foregoing are merely several examples for discussion purposes.

In an example scenario, the user 102 operating the user device 104 can interact with an application executed on the user device 104 or the merchant device 108 to conduct an electronic payment transaction with the merchant 106. The user 102 can receive, obtain or request items, services or appointments that are available to be acquired from the merchant 106. In one implementation, the environment 100 is designed to allow and process both traditional payment card transactions (i.e., those involving reading of physical card of the user 102 at the merchant's location), as well as card-not-present (CNP) transactions (i.e., those where the card is not physically presented at the time that the payment is effected). In a credit card transaction, for example, the merchant swipes the user's credit card through a card reader 130 at the merchant device 108. The term "swipe" here refers to any manner of triggering a card reader to read data from a card, such as by passing a card into or through a magnetic stripe card reader, optical scanner, smartcard (card with an embedded IC chip) reader (e.g., an EMV-compliant card reader), radio frequency identification (RFID) reader, Bluetooth-enabled reader, Near-Field Communication (NFC) enabled reader, or the like.

To initiate an electronic payment transaction for the item(s) being acquired, the merchant 106 via the merchant device 108 can determine a total amount to charge the user for the item(s)/service(s) being acquired and submit a request for an electronic payment transaction for the total amount of the transaction to the employment management server 111 and/or the payment processing system 112. Along with the total amount of the transaction, the merchant device 108 can send data read from the card, e.g., the cardholders name, credit card number, expiration date and card verification value (CVV). In response, the employment management server 111 and/or the payment processing system 112 can obtain, for example, from the user account information 156, data describing a financial account associated with the electronic purchase account of the user 102 to which the total amount will be charged.

Using the user account information 156, the payment processing system 112 can establish communication links with the card payment network computing device 160 and/or the bank computing device 162 to fulfill payment related to the transaction. If the transaction is approved by the computing devices 160 and 162, a payment authorization message is sent to the merchant device 108 via a path opposite of that described above.

In a card-not-present transaction scenario, for example, the user 102 places an online order by transmitting the data of a credit card from the user device 104 to the merchant device 108. The merchant device 108 can include, e.g., a web server for receiving the online order information. The merchant device 108 can then send the data of the card to the computing devices 160 and 162 via server 111 and system 112. The computing devices 160 and 162 complete the transaction in a way similar to the traditional credit card transaction.

In some implementations, the payment processing system 112 can include one or more server computers programmed to collect transaction information. The payment processing system 112 can collect the transaction information from various parties, such as the merchant device 106, the card payment network computing device 160, and the bank computing device 162. As mentioned previously, the transaction information of a transaction can include, e.g., an amount of the payment transaction, an identification of the associated financial account, an identity of the merchant, and item-level information. The item-level information relates to the goods or services involved in the payment transaction. The item-level information can include names, identification numbers, prices, or descriptions of the goods or services. For example, item-level information of a purchase in a coffeehouse can include information such as iced coffee and apple pie (i.e., names), SKU102 and SKU 231 (i.e., stock-keeping unit numbers), $2.99 and $3.49 (i.e., prices).

Based on the transaction information, the payment processing system 112 can provide an interactive user interface listing details of the payment transaction to the user 102 in a variety of ways. For example, the payment processing system 112 can generate and send the interactive digital receipt to the user device 104 of the user 102. The user device 104, based on the instructions received from the payment processing system 112, the merchant device 108 or the user preferences, can present the interactive digital receipt in different forms, such as a short messaging service message, an electronic mail, a tweet (message delivered via Twitter®), an instant message, webpage, a web URL, a hyperlink, a "click here" message leading to a webpage, a push notification, or a display 118 within a mobile payment application. The user 102 can interact with the interactive digital receipt for performing various tasks, such as confirming the total amount, adjusting tip amount, entering feedback, applying promotional discount, etc.

In one implementation, the payment processing system 112 may also include postings or advertisements related to employment vacancies available at the merchant's location or at any other merchant's location. Such information being displayed on the interactive digital receipt, for example along with the transaction information. To this end, the user interaction module 146 and merchant interaction module 148 operate to connect with the user devices 104 and merchant devices 108, respectively. For example, the modules 146 and 148 may operate in accordance with instructions from the employment application module 152 to request or provide information on behalf of the employment application module 152. The employment application module 152 may handle: (a) the generation of employment vacancies; (b) receipt and analysis of incoming employment vacancies; and (c) applications obtained in response to the vacancies. For example, the employment application module 152 may utilize the user interaction module 146 and the merchant interaction module 148 to handle communication with the user 102 and merchant 106, respectively. For example, the merchant interaction module 148 may send messages, notifications and/or alerts to the merchant 106 to enter a vacancy, modify the vacancy say after lapse of a predefined time period, or notify the merchant of incoming applications in the employment database 154 of the employment management server 111 in response to merchant's previously created employment vacancies.

The employment database 154 may include one or more data structures within merchant information 158 to store information related to merchant's employment vacancy including, but not limited to, the merchant/employer 106 posting the employment vacancy, employment title, alternate employment titles, employment attributes, employment keywords (for example, keywords to identify an employment like barista, experienced, etc.) candidate keywords (for example, merchant may be looking for keywords in a candidate's resume, such as, team player, certified, etc.), and minimum qualifications/certifications required for the employment, and/or like. Additionally, in some implementations, the merchant 106 may populate and submit employment vacancy details including, but not limited to, referral bonus, coupons or rewards for each referral a customer makes, base salary, starting bonus for the candidates, etc., via the employment administration module 139 to be stored in the database 154 via the merchant interaction module 148. For example, the merchant 106 via the merchant device 108 may store the employment vacancies in the employment database 154 using one or more SQL queries substantially in the following form:
INSERT INTO MerchantInformation (Job Title, Job KWRD, Candidate KWRD, Rewards, LocationMerchant)
VALUES ("employment title", "employment keywords", "candidate keywords", "rewards", "Location of the merchant or merchant device");

Similarly, via the user interaction module 146, the user 102 may submit an employment application with or without a resume and receive a notification when his or her application is accepted, under processing, or declined. In some implementations, the user 102 may populate and submit an employment application including, but not limited to, resume, cover letter, contact details, information related to a web portal where their resume is saved, information related to their social network profile, e.g., LinkedIn®, Facebook®, etc., via the employment application module 124 and the user interaction module 148. The employment application can be stored in the employment database 154. Additionally, the user 102 may provide access to their contact book stored locally on the user device 102 or at another location. In other implementations, the users 102 may submit refer one or more of their contacts for the employment vacancy. The user 102 may make such referrals by submitting information related to the contact, e.g., contact address, contact phone number, link to their social network profile, etc., or by submitting resume on their behalf. All such information may be included within the definition of an employment application. The user 102 via the user device 104 and the employment management server 111 may store the employment applications in the employment database 154 using one or more SQL queries substantially in the following form:
INSERT INTO UserInformation (Vacancy, CoverLetter, Resume, Compensation, ContactInformation, SocialNetworkProfile, Referral, LocationUser)
VALUES ("the vacancy for which application is submitted", "cover letter", "resume for the vacancy", "desired compensation", "contact information", "link to the social network profile", "referral information", "location of the user or user's device");

In response to a transaction at one of the locations of merchant 106, payment processing system 112 in communication with the employment management server 111 may present a randomly selected employment vacancy to the user 102 or contacts of the user 102 on the interactive digital receipt. In another implementation, the payment processing system 112 in communication with the employment management server 111 may select a specific set of employment vacancies for the user 102 or contacts of the user 102, where the selection may be based on a variety of factors, referred to as employment recommendation factors that may filter or tailor the employment vacancies according to the user. Some examples of employment recommendation factors are provided in the following paragraphs.

In one example, the employment recommendation factor may relate to the interactions between the user 102 and merchant(s) 106 in the past. For example, a transaction module (not shown) within the payment processing system 112 may consider information regarding the user's transaction history with merchants. Such information may be utilized generally or may be filtered for information relating to interactions with the current merchant 106 or with merchants 106 similar to the current merchant 106 (e.g., in the same geographical area or same line of business). General information about the user's past transactions may include information shopping habits of the user 102, how often the user 102 visits or interacts with the current merchant 106 and/or similar merchants 106, how much the user 102 typically spends during those interactions, and patterns, if any, in the type of merchants 106 that the user 102 visits. For example, if a user web history indicates that user 102 has been visiting job sites and particularly searching for the position "manager", it may be determined that the user 102 may be in the job market. Additionally, user transaction history on analysis may reflect that he has been shopping for books related to small businesses at the same book location. Accordingly, if a book manager position opens up at the bookstore, the merchant/potential employer 106, such as the bookstore manager, may associate details of the employment vacancy with the interactive digital receipt the next time the user 102 buys a book.

Another employment recommendation factor that may be considered is the distance of the merchant 106 or merchant device 108 from the user's home or user device 104. In particular, a large distance of the merchant's or potential employer 106 from user's home may indicate that the user would be less willing to apply for the vacancy. The distance may also be computed against all user contacts or contacts that meet the employment description. In another implementation, another merchant 106 in user's geographical area having an employment vacancy meeting the user's employment profile may be connected with the user 102. Optionally, the employment vacancy may be presented to the user 102 for further action. Another employment recommendation factor that may be considered is the user's stated intent or preferences. For example, when the user 102 begins the transaction with the merchant 106, the user 102 may indicate either through the preferences in the user account information 156 or verbally that the merchant 106 should alert the user 102 when an employment vacancy is made available at the merchant's 106 location. More particularly, a user 102 may tell a bar manager to inform the user 102 when the position of bartender opens up.

Still another employment recommendation factor that may be considered relates to the user's professional profile. In one implementation, the user 102 may create a professional/employment profile along with a transaction profile, and store in the employment management server 111. In another implementation, the user 102 may submit a resume and/or cover letter as professional profile. In yet another implementation, the user 102 may provide or link his or her social network profile. The profile may be analyzed to determine whether or not an employment vacancy is fit for the user 102. For example, the employment application module 152 may parse the profile to detect specific keywords or qualifications in user's past or present employment history. Accordingly, once a user 102 or a contact of the user 102 is identified, the employment vacancy may be presented to the identified user.

As would be understood by one of ordinary skill in the art, the above discussed factors for generating recommendations for employment vacancies by the payment processing module 112 or the employment management server 111 are merely examples and are not to be considered to be limiting. Many other factors would be apparent to one of ordinary skill in the art in view of the disclosed subject matter.

In one implementation, based on the employment recommendation factors, including but not limited to, merchant's preferences, merchant's location, user's transaction history, user's professional qualifications, user's professional history, and/or like, the payment processing system 112 may use one or more data mining models or information retrieval statistical models, e.g., term frequency-inverse document frequency (tf-idf), Okapi best matching (BM25), BM15, language models with Jelinek-Mercer smoothing or Dirichlet smoothing, etc., to rank the vacancies in the employment database 154 and associate one or more of the ranked vacancies with the interactive digital receipt, say based in the order of ranks. In one example, only the employment vacancy with the highest relevance or rank can be published on the interactive digital receipt via the payment processing system 112. In another example, a randomly selected employment vacancy may be displayed on the interactive digital receipt. In yet another example, a hyperlink of the employment vacancy may be displayed on the interactive digital receipt, where the hyperlink when selected lands on a webpage having additional information related to the employment vacancy and instructions on how to apply. In yet another example, the merchant 106 or user 102 may be able to query the employment database 154 for an employment vacancy using specific keywords or phrases, for example, using one or more SQL queries substantially in the following form:

SELECT * FROM MerchantInformation;
WHERE JobKWRD='Barista'

In the example above, a user 102 searches for the keyword 'Barista' in the data-structure 'MerchantInformation' that stores vacancies from all merchants. The user 102 can further refine the search by adding another clause to sort the results on the basis of location:

SELECT * FROM MerchantInformation;
WHERE JobKWRD='Barista' AND LocationMerchant='San Francisco'

In one implementation, the payment processing system 112 can communicate with the computing device 160 of a card payment network to complete an electronic payment transaction for the total amount to be charged to user's electronic payment account. Once the electronic payment transaction is complete, the employment management server 111 or the payment processing system 112 can communicate data describing the electronic payment for the transaction to the user device 104, e.g., as an interactive digital receipt, which can, for example, notify the user 102 of the total amount charged to the user 102 for the electronic payment for the transaction with the particular merchant 106. Further, the payment processing system 112 can determine one or more employment vacancies relevant to the user 102 or one or more contacts of the user 102. The payment processing system 112 then integrates the transaction and employment information and displays the integrated information on one or more interactive digital receipts on the user device 104 of the user 102.

The payment processing system 112 can present the interactive digital receipt to the user device 102 or the merchant device 106 in different forms, such as a SMS, a tweet (message delivered via Twitter™), an instant message, an email, a webpage, a push notification, a display 118 or display 132. Furthermore, a plurality of vacancies may be displayed in a variety of layouts, e.g., grid, list, etc., or with a map of merchant location. Additional action items can be provided to the user to facilitate interaction with the interactive digital receipt or third-party applications embedded in the interactive digital receipt. The user 102 can interact with the interactive digital receipt for performing various tasks, such as adding tip on the receipt, applying to a job, sharing the information with potential candidates such as friends, family, other contacts, etc., storing the employment information, etc.

For example, the user 102 may apply to the employment vacancy on the interactive digital receipt through the employment interface 123 and the employment application module 124. Additionally or alternatively, the user 102 may know of someone who may be fit for the position and may provide contact details of the contact to the merchant 106 either directly via the payment service interface 122 or through the employment interface 123. In another scenario, the user 102 may, on behalf of the potential candidate, store the contact's basic details or even the resume in the database 154 via the employment interface 123. Furthermore, the user 102 may share details of the employment vacancy with his or her contacts through a web URL by providing merchant's contact details, or any other means. For such referrals, the merchant 106 may provide a reward in the form of referral bonus to the user 102, for example when the referred candidate accepts an employment offer.

To this end, the merchant 106 via the merchant device 108 may interface with the employment management server 111 (e.g., via the employment interface 137) and access financial information of the user 102 stored either in the user account information 156 or the payment processing system 112 (e.g., via the payment service interface 136). The payment processing system 112 may then initiate deposit of referral bonus in the user's account. In another implementation, the merchant 106 may directly request financial information from the user 102 to initiate deposit of referral's bonus. In another example, the merchant 106 may provide a coupon for the next time user 102 performs a transaction with the merchant 106. The coupons may be saved in the user account information 156 or the payment processing system 112 and may be applied automatically when the user returns for another transaction. In one implementation, the merchant 106 may vary the value of referral bonus or coupon based on various factors, such as urgency to fill the employment vacancy, the base salary associated with the vacancy, the number of times the user 102 frequents the merchant 106, the number of referrals made by the user 102 over a period of time, etc. Additional embodiments are further explained with reference to FIGS. 2-6.

Figure 2:
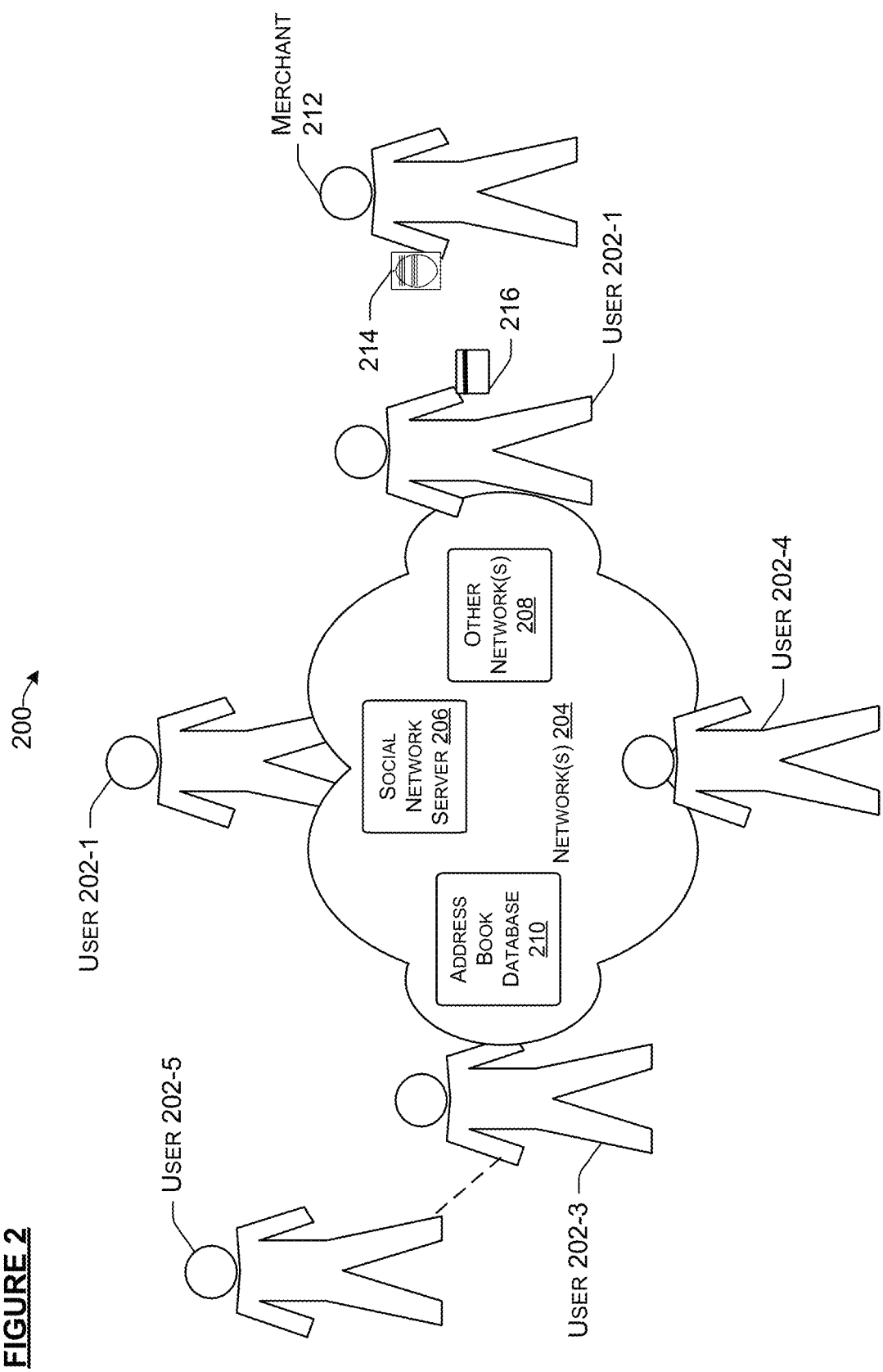
FIG. 2 is a network diagram illustrating an example scenario of presenting customers or contacts of customers with an employment vacancy at a merchant's location, according to an embodiment of the present subject matter.

FIG. 2 is an example network diagram 200 that provides context for the discussion of various scenarios with respect to FIGS. 1-5. In particular, FIG. 2 is an illustration of a scenario occurring at a store in a mall where in response to a transaction, the merchant may recommend an employment vacancy to the user after a transaction. In general, the scenario is as follows. A user, for example user 202-1 (interchangeably referred to as user 202 hereinafter) may be connected to one or more users, such as users 202-2, 202-3, 202-4, and 202-5 (also referred to as contacts of user 202) either directly or indirectly through one or more networks 204. For example, user 202-2 may be a friend of user 202-1 ("primary contact") communicatively coupled to user 202-1 through a social network server 206. Examples of social network server 206 may include Facebook®, LinkedIn®, Slack™ Twitter® or any other offline or online network, club or forum 208 that allows a user to interact with another user. In another example, user 202-3 may be a friend or relative of user 202-1 ("primary contact"), where the relationship and connections between the users may be identified using an "address book" database 210 on the user device, such as user device 104. In yet another example, user 202-4 may be an ex-coworker of user 202-3 ("secondary contact"). A contact may also be indirectly related to user 202-1, for example, user 202-5 may be a friend of a friend of 202-3 ("tertiary contact"). In one implementation, such primary, secondary or tertiary contacts having one or more degrees of separation may be included within the definition of users or potential candidates for the purpose of the present subject matter.

As per the example scenario, merchant 212 may be a member of the service personnel of a clothing store in a mall having multiple stores. It is also assumed that merchant 212 has an employment vacancy available at this store, say that of a store manager. The user 202 may be physically present at merchant 212 shopping for apparel. In another example, user 202 may be visiting an online website operated by merchant 212. Once user 202 is ready to leave, merchant 212 may be at the register to check out items bought by user 202. To process the transaction, merchant 212 creates a "checkout list" of items requested by user 202 using a merchant device 214. Subsequent to creating the list, the merchant 212 receives one or more of payment instruments 216 from the user 202 which may include various combinations of payment cards, cash, electronic payment information for use with the payment service of the payment processing system 111, and so on. Merchant device 214 is provided with these payment instruments 216, for example, by the merchant 212 swiping the payment cards 216, inputting the information regarding cash payments, communication with one or more user device(s) 104 of the user 202 (e.g. via NFC) and so on. While or after providing the payment instruments and/or items to the merchant device 214, merchant 212 may manually enter information related to user's professional history based on the interaction between him and the user 202. After items are added and payment instruments are received, merchant device 214 may initiate processing of the transaction by utilizing payment processing system 112 and/or the employment management server 111, collectively referred to as the payment processing system 112, hereinafter. In a typical case, the payment information goes through the card network and/or bank network for fulfillment of the transaction. Once approved by all parties involved, the transaction information is ready to be displayed to the merchant, indicating successful transaction.

In one implementation, the payment processing system 112 generates an intermediate receipt based on the transaction information. The payment processing system 112 may also obtain input from the merchant 212 regarding the user's professional profile either directly from the user 202 through user interaction, or a local database, or through the user information in the employment management server 111. The payment processing system, e.g., through a search engine, may determine identity and/or professional profiles of contacts of user 202, such as user 202-1, user 202-2, user 202-3, etc. So, in this example, the payment processing system 112 may determine, through professional profiles, that user 202-1 is a store manager at a competing store, or one of the contacts of the user 202-1, say user 202-3, has been a store clerk for three years and is currently looking for a job. The payment processing system 112 can detect both these users, e.g., users 202-1 and 202-3, as potential candidates for the position available at the merchant's store. Accordingly, the payment processing system 112 may generate another receipt having information about the vacancy at the merchant's location, the receipt may either be separate from the intermediate receipt or may be a single receipt that combines the transaction information in the intermediate receipt with the employment information. In other implementations, a single receipt is generated showing the transaction and employment information at the same time. The employment information may be displayed at the user device 104 or at the merchant device 214 or both in a receipt form.

The digital or paper receipt may have interactive components to allow user 202 to apply to the employment vacancy or share the information related to the employment vacancy with one or more contacts, such as user 202-2, 202-3, 202-4, 202-5, or even publish it on a public forum for anyone to see. Optionally, payment processing system 112, based on an analysis of user's professional profiles, may suggest that user 202-1 share it with a specific contact. For example, the receipt may suggest "Your contact User 202-3, may be interested in joining us. Please share this employment vacancy with him/her." Additionally, merchant 212, via the payment processing system 112, may incentivize the sharing action by offering rewards, coupons or referral bonus if, after user's recommendation, the user's contact accepts the employment offer.

In some cases where a plurality of vacancies are available at a merchant's location, the merchant 212 using the merchant device 214 may manually make selections of an employment vacancy from amongst a plurality of employment vacancies that he or she wants to suggest to the user 202-1. Alternatively, the payment processing system 112 may select an employment vacancy from amongst a set of available vacancies by matching individual professional profiles with the description of the employment vacancy.

Some embodiments described above may relate to scenarios where user 202-1 approaches an online or brick and mortar store of the merchant 212 with an intent to make purchases, it will be understood however that the description can be extended to scenarios where user 202-1 is in the database of the merchant 212 either directly or indirectly, e.g., as a contact of a user making purchases at the merchant's store. For example, user 202-1 may be within a geographical distance from the merchant 212 and in an attempt to attract user 202-1 to the store, merchant 212 may present a mock interactive digital receipt having details of an employment vacancy through rewards, referral bonus, and the like. Furthermore, the description is not limited to a user making purchases at a store belonging to merchant 212, and can be configured to include other merchants, e.g., within a geographical area of merchant 212 and/or merchants having employment vacancies matching the professional profile of the user 202-1, 202-2, and so on.

In view of this general description of the scenario illustrated in FIG. 2, various techniques for performing the associated tasks for employment referrals in interactive digital receipts are discussed with regard to FIGS. 3A-6.

Figure 3A:
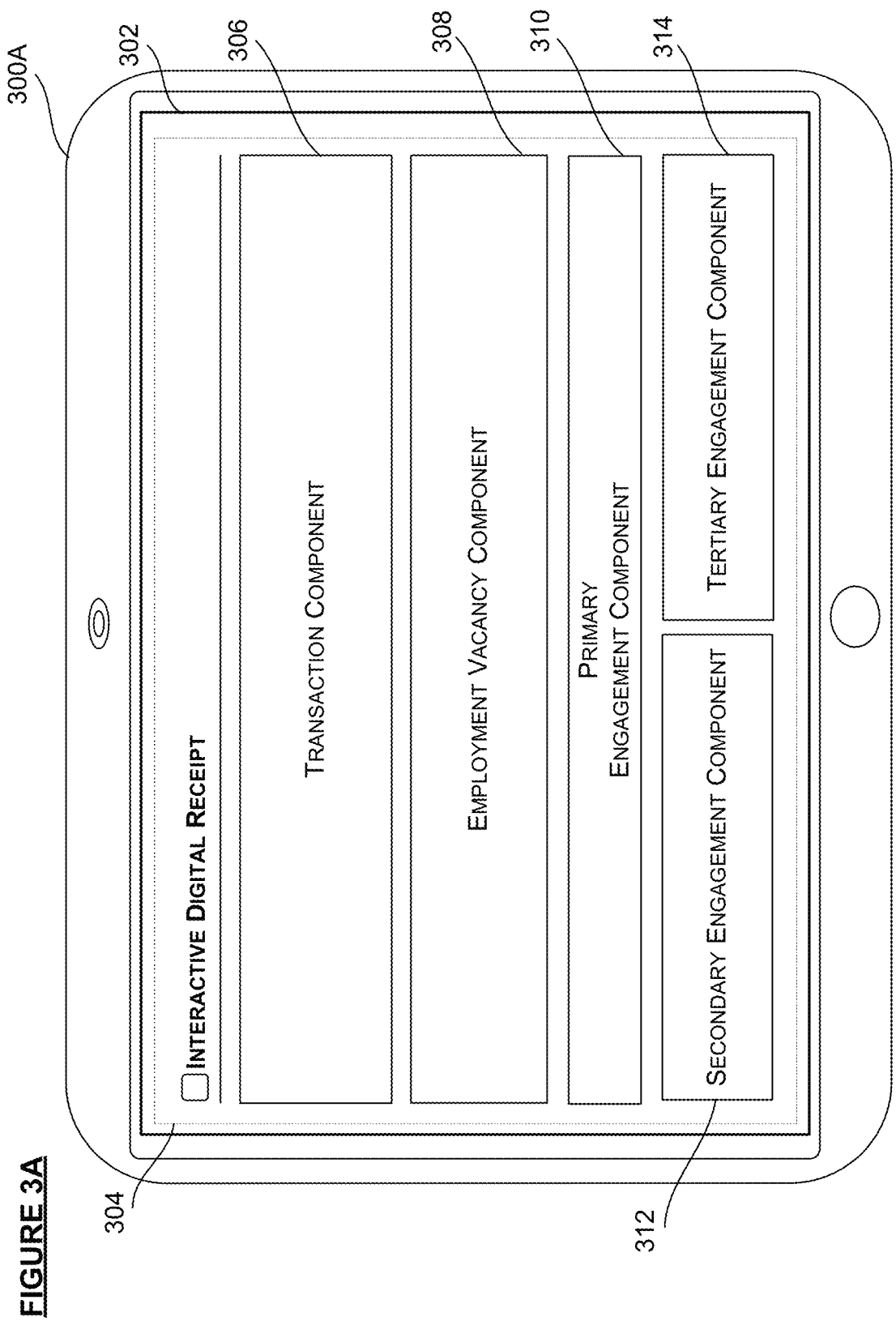
FIG. 3A is an exemplary graphical user interface for presentation on a mobile device, according to an embodiment of the present subject matter.

FIG. 3A is an exemplary interactive digital receipt 300A implemented on a mobile device 300A, according to an embodiment of the present subject matter. A mobile device 300A can be a smartphone (e.g., iPhone®, Android®-enabled phone, etc.), a personal digital assistant (PDA), a tablet, an e-reader, or other mobile or portable computing devices, a desktop, a laptop, or other wired and wireless personal computers. In the embodiment of FIG. 3A, mobile device 300A is a tablet computer. Mobile device 300A is equipped with a display screen 302 for displaying various user interfaces to enable a customer (e.g., user 102) to interact with content generated on the mobile device 300A. As an example, the mobile device 300A can be user device 104, merchant device 108 or merchant device 214.

Mobile device 300A can implement an application, such as an interactive receipt mobile application for use by a mobile user, e.g., user 102 or merchant 106, where the interactive receipt mobile application includes one or more customer interface components of interactive digital receipt 304. The interactive receipt mobile application can run either on the device of a user, a merchant, or a network server. As used herein, the term "user interactive component" refers to a component of a user interface intended for a user, customer or candidate to view and interact (e.g., submit inputs) with various features offered via interactive digital receipt 304.

In one implementation, interactive digital receipt 304 includes information indicative of the payment transaction, such as transaction information (e.g., payment amount and item description), information indicative of an employment vacancy either directly or indirectly related to the user, such as employment information (e.g., employment vacancies at the merchant's location or elsewhere), and various features that allow the user to perform an action associated with the transaction and employment application, subsequent to delivery of the receipt to the customer. While interactive digital receipt 304 is embodied in a mobile application according to embodiments of FIGS. 3A and 3B, other embodiments of the receipt are possible in accordance with the present subject matter. In some embodiments, interactive digital receipt 304 is embodied in a text message that can be received at a computing device (e.g., devices 300A, 300B, user device 104, merchant device 108, and merchant device 214). In some embodiments, interactive digital receipt 304 is embodied in an email message that can be received at the computing device.

In some embodiments, the payment processing system 112 generates interactive digital receipt 304 for a customer after completion of a payment transaction between the customer and a merchant (e.g., payment authorization and approval that occurs at the completion of a service and/or tendering of goods). The payment processing system 112 then delivers receipt 304 to the user at the user's mobile device 300A. In some embodiments, the payment processing system 112 includes a digital receipt system that carries out the functionalities associated with implementing receipt 304. For the purpose of discussion, it is assumed hereinafter that the functionalities of the payment processing system 112 and the employment management server 112 are part of a single entity referred to as payment processing system 112. This, however, does not affect the way the receipt 304 is generated, presented or perceived.

The mobile device 300A receives and displays the interactive digital receipt 304 on display screen 302. Interactive digital receipt 304 may take up an entirety or any portion of display screen 302, for example as a pop-up window. Interactive digital receipt 304 can include various contents offered to the customer. In the embodiment of FIG. 3A, interactive digital receipt 304 includes a transaction component 306, an employment vacancy component 308, and one or more interactive components, e.g., primary engagement component 310, secondary engagement component 312, tertiary engagement component 314, and so on. The transaction component 306 displays details associated with a particular transaction between the customer and the merchant, where the transaction details may be displayed in real time in response to an occurrence of the particular transaction (e.g., payment transaction at the completion of a service). The employment vacancy component 308 displays details associated with one or more job openings or employment vacancies available either at the merchant's location or elsewhere. The interactive components 310, 312, 314 display one or more features for the customer to interact or perform an action associated with the transaction and/or employment vacancy. In some embodiments, the features are generated so as to be available via the interactive digital receipt 304 within a predefined time period or at a location. The predefined time period, location, or other parameters may be configurable by the merchant and allows the merchant to provide time-based or location-based incentives to engage the customer.

The interactive components for the transaction component 306 and the employment vacancy component 308 and general look and feel of interactive digital receipt 304 can be configured according to a particular merchant's requirements or preferences. For example, a merchant in the business of creating personalized financial plans can configure the interactive digital receipt to generate a feedback component without generating a tipping component. In another example, a merchant in the business of delivering food items can choose to have both the tipping and the feedback components be generated in the interactive digital receipt 304. Thus, the primary engagement component 310 may be the feedback component and the secondary engagement component 312 may be the tipping component.

Similarly, the interactive components for the employment vacancy component 308 may include one or more of a share component, a location component, a store component, a rewards component, and a configuration component. In one example, the primary engagement component 310 may be the share component and the secondary engagement component 312 may be a reward component, and a tertiary engagement component 314 may be the location component.

In one example, the share component may be used by the customer to share the employment vacancy on the interactive digital receipt 304 with one or more of customer's contacts associated with his or her contacts book, or social network, or via email or text message to contacts outside of the stored contacts. In some implementations, the interaction with the share component may generate another interface of options allowing a customer to share the employment vacancy using a variety of ways.

The location component may display the exact location associated with the employment vacancy. For example, if the merchant generating the receipt has a job available at their location, the location component can display the location of the merchant's store(s) where the job is available.

The store component allows the customer to store the employment vacancy for future consideration. The configuration component can provide customers options to modify suggestions for job vacancies that a customer receives (e.g., by changing preferences or professional profile), browse through a plurality of employment vacancies, or even unsubscribe from the job suggestions and stop them from showing up in future receipts. Even though the present subject matter may be described with respect to some components, one of ordinary skill in the art will appreciate that other configurations and components are possible.

Figure 3B:
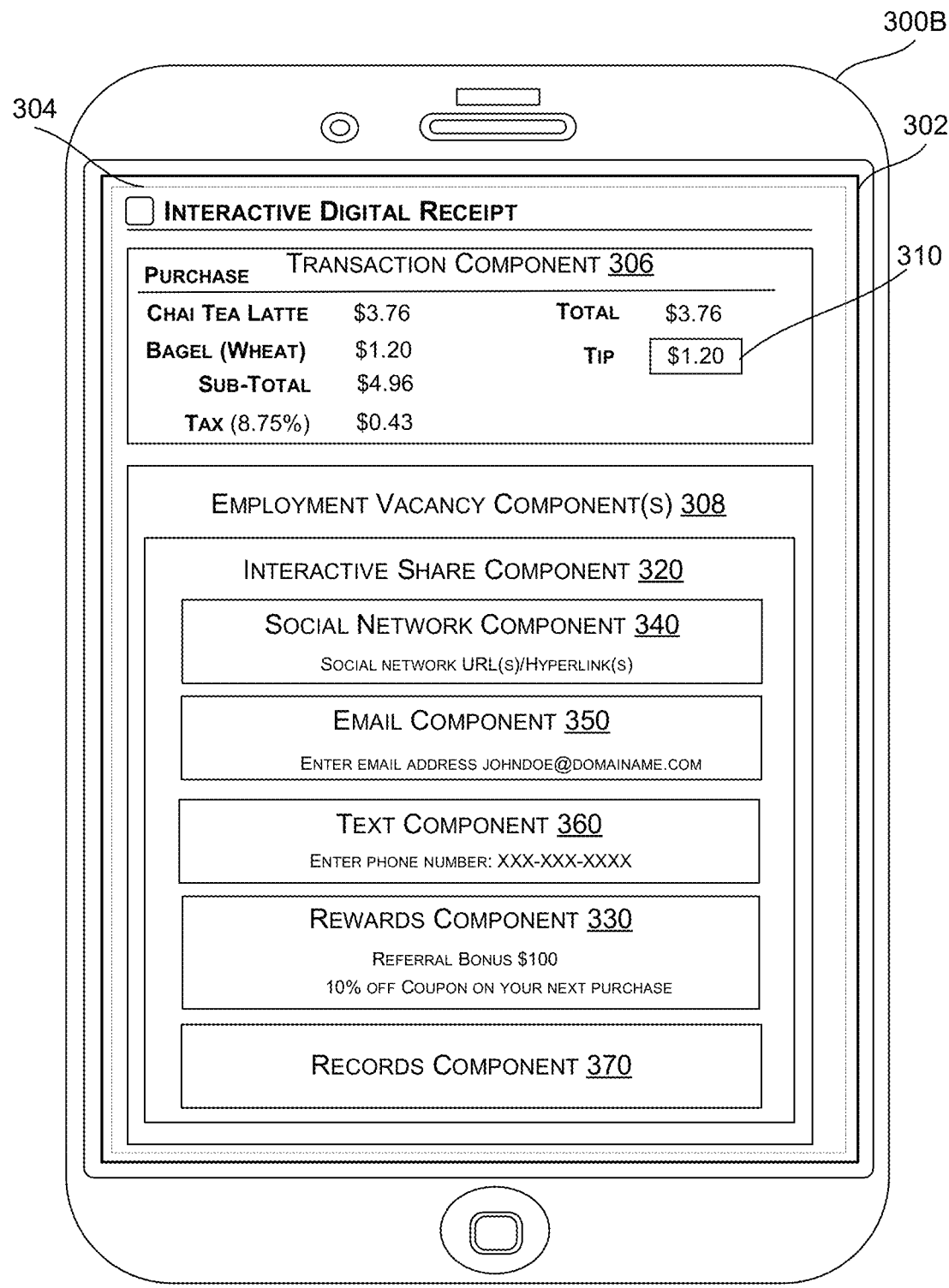
FIG. 3B is an exemplary graphical user interface for presentation on the mobile device, according to another embodiment of the present subject matter.

FIG. 3B illustrates a second embodiment of an interactive digital receipt implemented on a mobile device 300B. According to the embodiment of FIG. 3B, the mobile device 300B is a smartphone. Mobile device 300B may be equipped with a display screen 302 for displaying various user interfaces to enable a user (e.g., user 102) to interact with content generated on the mobile device 300B. As an example, the mobile device 300B can be user device 104, merchant device 108 or merchant device 214.

In FIG. 3B, interactive digital receipt 304 includes transaction component 306 and employment vacancy component(s) 308. Transaction component 306 provides transaction information associated with the transaction. Transaction component 306 includes an overview of the transaction completed between the customer and the merchant, such as the total amount of the transaction, the payment card used for the transaction (e.g., payment card name or last four digits of a payment card associated with the payment card), and the date, among others. Transaction component 306 may also include details of the transaction, such as the name of the items purchased, the quantity, and the price, among others. For example, the transaction component 306 includes item-level information, such as chai tea latte and wheat bagel (i.e., item names), $3.76 and $1.20 (item prices).

As mentioned with reference to FIG. 3A, the transaction component 306 may be associated with interactive components, such as interactive feedback component, interactive tipping component, and the like. For example, the interactive tipping component (not shown) allows the customer to submit a gratuity ("tip") amount either at the time of transaction or at a later time, i.e., subsequent to completion of a payment transaction. Interactive feedback component (not shown) can be configured to allow the customer to provide a feedback for a services or products offered by a merchant.

The employment vacancy components 308 may further include an interactive share component 320, an interactive rewards component 330, an interactive social network component 340, an interactive electronic mail (email) component 350, an interactive text message component 360, and so on.

In one implementation, employment vacancy components 308 provide information pertaining to employment vacancies. The employment vacancies may relate to a position at the store of the merchant with whom the customer is interacting. In another example, the position may be posted by a merchant in the same geographical area as that of the merchant, for example, within 5 miles from the merchant's store. Further, in one implementation, the employment vacancies displayed on the mobile device 300B may be either randomly selected or directly related to the current or past work profile of the customer or in some cases, preferences set by the customer. Furthermore, the employment vacancy may be presented to a contact (friend, relative, coworker, etc.) of the customer but displayed on the customer's receipt to allow the customer to make a referral or recommendation. Relationships between a customer and his or her contacts and each of their professional histories may be obtained either explicitly through customer interaction, for example on a web interface, or by analyzing/parsing resumes, professional forums, web searches, social networks, etc., stored in a customer identification system, such as the employment management server 111.

In one implementation, the interactive share component 320 (or, "share component") allows the customer to submit referrals, share or respond to an employment vacancy displayed on their receipt 304 subsequent to completion of a payment transaction. The referral may include submitting, for example, a contact email address or phone number, a suggestion, or the like, based on the experience at a merchant's location. For example, a customer may know based on his interaction with the merchant or coffee barista that they may be in need of a store manager. Alternatively, the customer may, based on a negative experience at the merchant's location, may recommend a store manager that she knows via the share component 320. The merchant may receive the potential store manager's contact details through the receipt 304. In some embodiments, the recommendation is submitted directly to the merchant. In some embodiments, the share component 320 may aggregate a plurality of recommendations provided by a plurality of customers. The share component 320 then compares the recommendations with merchant' preferences, if any, and ranks the recommendations accordingly. If no such preferences are provided, the share component 320 may send all the recommendations to the merchant.

In some embodiments, the sharing may be time-based where the customer can share the employment vacancy within a predefined period, or timeframe. In such embodiments, the sharing time period may be associated with the availability of job and/or a maximum number of applications or shares a merchant has permitted.

An example transaction, for example, is payment for a meal at a restaurant, where the customer (a professional chef) can pay for the meal and receive an employment vacancy for an available chef position at the restaurant. The employment vacancy and its corresponding details may be printed on the receipt 304 for the customer to apply or share with others. The customer can apply to the employment vacancy after she has left the restaurant using appropriate interactive components on the interactive digital receipt 304 on her mobile device 300B, which has been delivered to device 300B automatically after completion of payment. In some embodiments, the payment processing system 112 receives the customer's interest in the form of her profile and application (with or without a formal resume and/or cover letter) against the employment vacancy via interactive digital receipt 304. In other embodiments, the payment processing system 112 receives referrals from customers in response to the employment vacancies presented to them. The payment processing system 112 may communicate and store customer's application or referrals onto the merchant's device 108, a job database 154, or an employment management server 111. The job database 154 may also store profiles of one or more customers in one or more data tables, and associate such tables with the respective merchant and employment vacancy. In one implementation, the merchant can access the stored profiles by searching the database 154 via the communication device 102 to determine the best candidate among the list of candidates for the employment vacancy, where the candidates are customers, referrals from customer, and/or others who may have submitted applications for the employment vacancy.

Using the contact details, for example, in the application profile, the merchant may schedule an interview with the candidate or even select the candidate based on the interaction at the time of transaction. The merchant may send the information back to the payment processing system 112, which may then send a notification to the customer via a default mode of communication or a mode selected preferably for job notifications.

Some embodiments of interactive share component 320 may include an interactive social network component 340, an interactive email component 350, an interactive text message component 360, and so on.

Interactive social network component 340, interactive email component 350, an interactive text component 360, etc., allow the customer to share the employment vacancy with one or more potential candidates (e.g., friends of the customer) via customer's social network client, email client, and messaging client, respectively. For example, customer A may share the employment vacancy with his or her contact by interacting with the interactive email component 350, which may generate a pop-up window where the customer populates the email address and/or phone number of the referral. The pop-up window may cover any portion of the display screen of the mobile device 300B. In other implementation, the email window may be a second window different from the window where the employment vacancy was presented.

Some embodiments may also include an interactive rewards component 330 (or, "rewards component") that allows a particular merchant to engage and incentivize a customer to interact with the merchant. In some embodiments, rewards component 330 generates one or more rewards associated with the completed transaction and subject to customer sharing the employment vacancy with one or more contacts. For example, on sharing the employment vacancy, merchant A provides a coupon that can be redeemed either at merchant A or at merchant B, a business affiliated with merchant A.

In one example, a "10% off" coupon is generated via the interactive digital receipt for the customer to redeem at a next meal with the merchant. Such a coupon may be set to decrease in value (i.e., until 0%) from the moment the coupon is generated subsequent to the transaction at the merchant's store. As such, the sooner the customer shares the employment vacancy, the higher the value she receives. In some embodiments, the merchant configures the rate of reduction. In one example, the restaurant sets the 10% coupon to expire after a week, with no reduction in value as long as the employment vacancy is shared. In another example, the restaurant sets the 10% coupon to expire after 3 days, where the value reduces each day until the value reaches 0% at the end of the third day, irrespective of whether the employment vacancy is shared.

In some embodiments, the customer redeems the reward by completing specific redemption, or promotional, activities, for example besides sharing the employment vacancy. Details of the activities may be displayed in the promotion component 330. Some redemption activities include providing contact details of five potential candidates. Other redemption activities include answering a questionnaire, where the questionnaire may include questions relevant to the employment vacancy. Some redemption activities include participating in activities with other affiliated merchants. The redemption activity and the decreasing rate of the time-based reward may be configured by the merchant offering the reward. Such configurations are beneficial as they allow the merchant to customize the promotions according to the merchant's business, such as tailoring to a specific customer demographic.

In some embodiments, rewards component 330 operates as an advertisement component to promote available jobs at one or more merchant locations. Such advertisement includes, for example, a reward to entice the user to "click-on" or apply to a particular employment vacancy being displayed via a separate web application or interface. In another example, the advertisement includes a plain display with no interaction required from the customer, where the interaction comes from the advertisement content changing to attract the customer's attention. The advertisement content can change based on the completed transaction for which the receipt 304 has been generated. The advertisement can include employment vacancies at nearby merchants associated with the venue where the completed transaction has taken place. In some embodiments, an interactive advertisement component (not shown) is coupled to the interactive transaction record, where advertisement content is changed based on details extracted from the interactive transaction record. For example, based on a verbal interaction between the customer and the merchant, the merchant may push a specific employment vacancy onto the customer's device 300B or application.

Rewards component 330 may also be configured to maintain and manage customer's loyalty points associated with a particular merchant. Some merchants, for example, choose to reward loyal customers with reward points for their candidate recommendations in response to the employment vacancy at a merchant's location. Rewards component 330 may track recommendation over time, stores and updates reward points based on the number of referrals/recommendations made by a customer and then conversions of those recommendations into actual offers and/or acceptances. In some embodiments, the reward may be time-based, where the customer can redeem the reward within a predefined period, or timeframe. In such embodiments, the reward is configured to reduce, or decrease in value, corresponding to a decrease in the passage of time associated with the time period. The time period associated with the rewards component 330 ("reward time period") may be configured to be the same as, or different from, the sharing time period.

In an illustrative example, the rewards record tracks the number of employment vacancies shared through merchant A's interactive receipt 304 and updates the customer to an "elite status" in relation to that merchant when the customer has shared and managed to get five candidates to apply for the job. In another example, the customer may receive "elite status" if a candidate recommended by a customer gets recruited by the merchant. The elite status may be displayed in the rewards component 330. The customer can redeem for a reward at the merchant's location with the rewards record. In some embodiments, the merchant's payment processing system 112 can communicate with the rewards component 330 without need for the customer to physically show the rewards record at time of redemption.

Interactive records component 370 ("records component") includes one or more interactive digital receipts 304 that may have resulted from one or more payment transactions carried out by the customer with one or more merchants. In some embodiments, records component 370 is configured to include only interactive digital receipts associated with a particular merchant. In some embodiments, records component 370 is configured to include all interactive digital receipts 304 associated with the customer, including receipts 304 associated with different merchants with whom the customer has transacted. The interactive record allows the customer to organize her interactive digital receipts 304, to maintain a comprehensive view of all payment transactions, referrals/recommendations, and/or job applications and to perform one or more actions via respective interactive components of the receipts.

Other interactive components not discussed above, but consistent with the techniques discussed throughout, may also be envisioned by one of ordinary skill in the art based on the disclosed technology.

Figure 4:
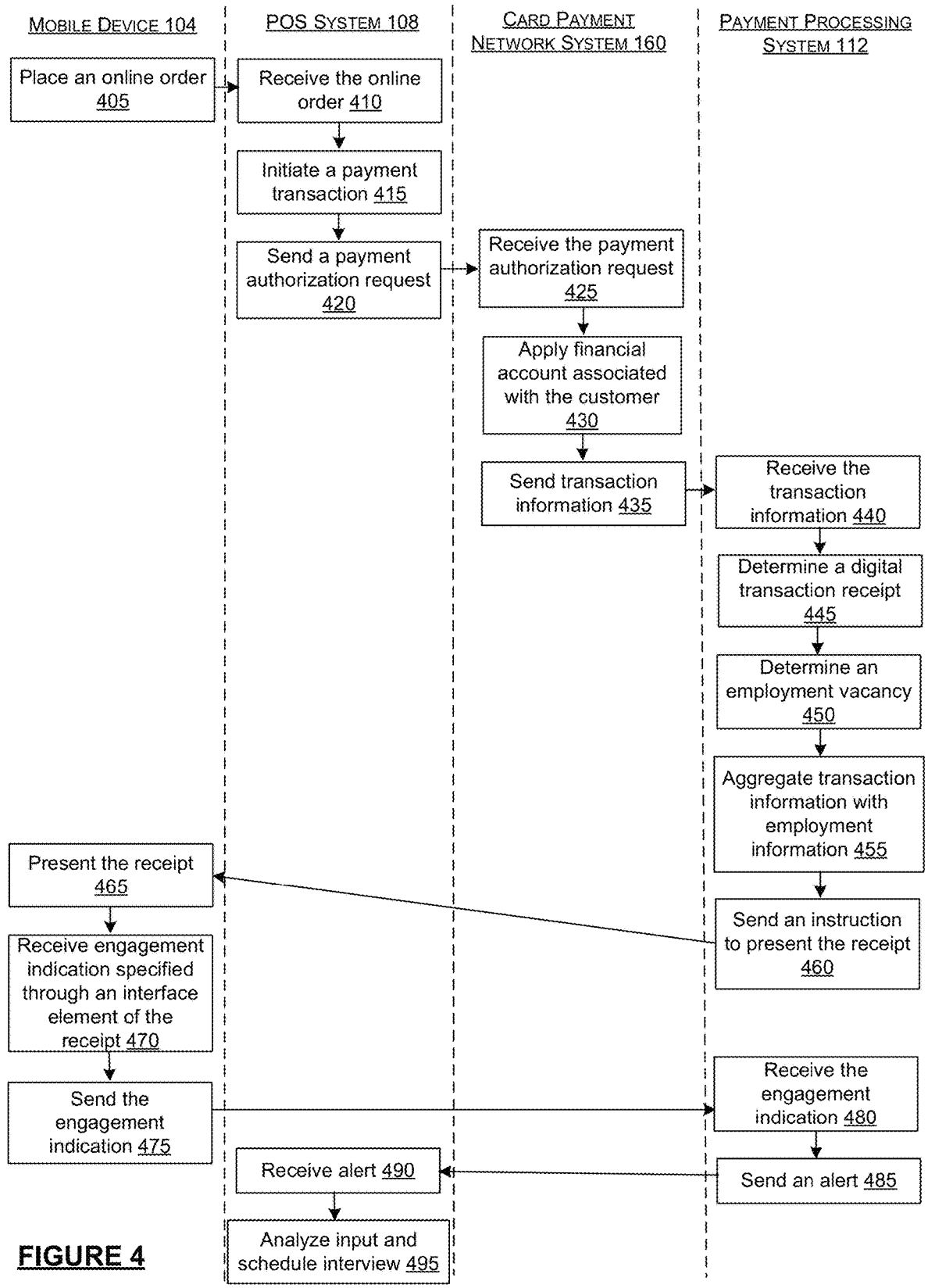
FIG. 4 is a flow diagram illustrating an example process for generating digital receipts having interactive elements, according to an embodiment of the present subject matter.

FIG. 4 illustrates an example of a process of collecting transaction and job recommendation or applications by a payment processing system, e.g., payment processing system 112. Initially, a customer instructs his or her mobile device 104 to place an order (step 405), using, for example, a mobile browser on a mobile payment application. Upon receiving the order from the mobile device 104 (step 410), a merchant server 108 (e.g., the POS system 108 illustrated in FIG. 1) initiates a payment transaction for the order (step 415). In some alternative embodiments, the merchant server 108 initiates the payment transaction when a payment card swipes through a card reader connected to merchant server 108 or included in the merchant server 108.

The merchant server 108 sends to the card payment network system 160 a payment authorization request for the payment transaction (step 420). Upon receiving the payment authorization request (step 425), the card payment network system 160 applies the financial account associated with the customer and the card payment network system 160 (step 430) and sends transaction information of the payment transaction to the payment processing system 112, for example, through an application programming interface (API) (step 435).

The payment processing system 112 has access to information of the financial account and information to enable the payment processing system 112 to communicate with mobile device 104. The payment processing system 112 receives the transaction information from the card payment network system 160 (step 440). Based on the transaction information, the payment processing system 112 generates a digital transaction receipt indicative of the payment transaction (step 445). At this time, the payment processing system 112 also determines one or more employment vacancies from a job database, e.g., database 154, based on predefined rules (step 450). In one implementation the database is located within the payment processing system 112, while in other implementations, the database may be located externally. For example, the payment processing system 112 may query the job database 154 for employment vacancies based on identity or location of the merchant server 108. As such, the employment vacancies may relate to jobs at the merchant's location or within a geographical area defined by the merchant's location coordinates. Additionally or alternatively, the employment vacancies may relate to customer's profile, preferences set by the customer and/or contacts of the customer. In another example, the employment vacancies may be extracted based on customer's transaction history and location tags associated therewith. One or more statistical models may be used to analyze customer's transaction history and geo-tags along with his professional profile to determine where he spends majority of the day and accordingly, determine his professional interests. As an example, a customer's transactions may be analyzed and determined that he frequently shops at store A and is a store manager at store B, which is a smaller store than store A. The payment processing system 112 may present the customer with employment vacancies at store A that may, statistically, be of interest to the customer.

The payment processing system 112 aggregates the transaction and a selected employment vacancy for display on one or more interfaces as part of one or more interactive digital receipts (step 455). The payment processing system 112 then transmits to the mobile device 104 of the customer an instruction for a mobile application in the mobile device 104 to display (or output in any other manner) the interactive digital receipt with transactional and employment vacancy to the customer (step 460). In one implementation, the payment processing system 112 is not a participant in processing the payment transaction and is not in a payment transaction message flow between the merchant's POS system 108 and a card issuer or card payment network system 160 involved in the transaction.

The mobile device 104 displays (or otherwise outputs) the interactive digital receipt that lists item-level information relating to goods or services involved in the payment transaction, employment information relating to employment vacancies at the merchant's location or elsewhere, and includes one or more interface elements to enable the customer to facilitate one or more of the following: (a) specify a gratuity amount of the payment transaction; (b) select an employment vacancy from among multiple vacancies; (c) share a selected employment vacancy with one or more contacts, where the contacts may be selected from a phone book, email contacts list, social network list, or manually entered by the customer; (d) store the employment vacancy for future consideration; and/or (e) apply to the employment vacancy directly through the interface displaying the interactive digital receipt (step 465). The interactive digital receipt can further include a link to a website or a mobile application to apply to the employment vacancy.

Next, the mobile device 104 receives an engagement indication specified by the customer through the interface element (step 470). Engagement indication may include, for example, the customer inputting a recommendation/referral or his own profile in response to an employment vacancy. The mobile device 104 sends a message indicative of the engagement indication to the payment processing system 112 (step 475).

Upon receiving the message indicative of the engagement indication (step 480), the payment processing system 112 sends to the POS system 108 an alert based on the engagement input that has been specified by the customer (step 485). Accordingly, the POS system 108 may receive the engagement input (step 490) and analyze the engagement input and/or schedule interviews or reject/accept the customer or his/her contact for the employment vacancy. (step 495).

In some embodiments, the interactive digital receipt presented by the mobile device 104 includes a user interface element to enable the customer to specify a reward. The payment processing system 112 sends a request to the card payment network 160 to confirm the validity of the reward and to adjust the amount of the current payment transaction based on a promotion associated with the reward if the reward is valid. Alternatively, the reward information may be stored for future transactions.

Figure 5:
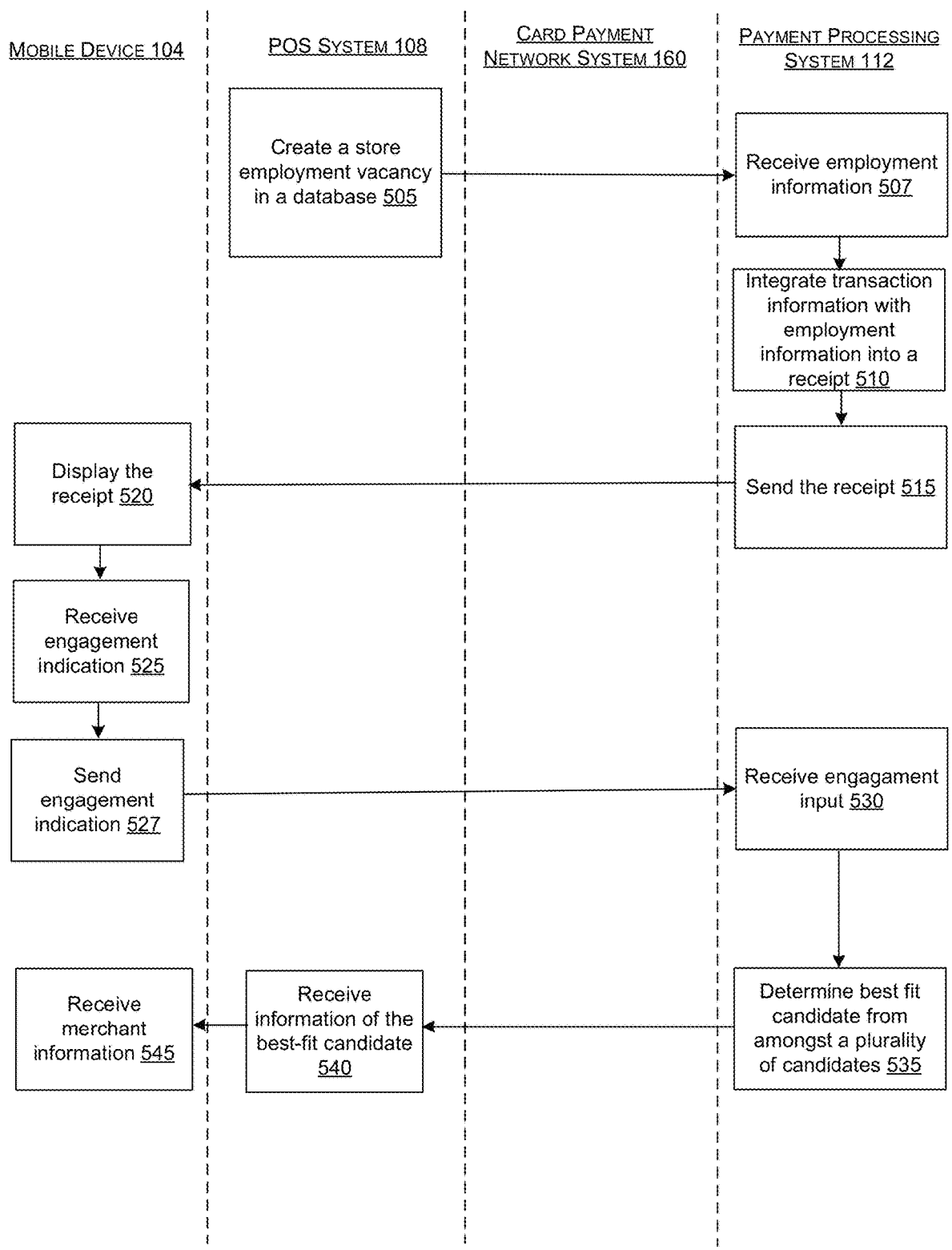
FIG. 5 is a flow diagram illustrating an example process for determining a best-fit candidate among a set of candidate applications from customers or contact of customers for an employment vacancy at a merchant location, according to an embodiment of the present subject matter.

FIG. 5 illustrates an example of a process of selecting a candidate from a set of candidates based on collected employment applications stored in a database via payment processing system. Initially, the merchant 106 via merchant device 108 may create at least one employment vacancy and store in a database associated with the payment processing system 112 (step 505). To this end, merchant device 108 may send the information to the payment processing system 112 (step 507).

In one implementation, the payment processing system 112 receives details of a current payment transaction or extracts details of a past transaction. The payment processing system 112 also receives one or more employment vacancies from a job database, where the employment vacancy may be selected based on identity or location of the merchant server, customer's profile or preferences set by the customer and/or contacts of the customer, customer's transaction history and location tags associated therewith, and so on. The payment processing system 112 integrates the transaction and employment information to generate one or more interactive digital receipts (step 510). The payment processing system 112 then transmits to the mobile device 104 of the customer an instruction for a mobile application in the mobile device 104 to display (or output in any other manner) the integrated interactive digital receipt having transactional and employment vacancy to the customer (step 515).

The mobile device 104 displays (or otherwise outputs) the interactive digital receipt that lists item-level information relating to goods or services involved in the payment transaction, employment information relating to employment vacancy at the merchant's location or elsewhere, and includes one or more interface elements to enable the customer to facilitate one or more of the following: (a) specify a gratuity amount of the payment transaction; (b) select a employment vacancy from among multiple vacancies; (c) share a selected employment vacancy with one or more contacts, where the contacts may be selected from a phone book, email contacts list, social network list, or manually entered by the customer; (d) store the employment vacancy for future consideration; and/or (e) apply to the job posting directly through the interface displaying the receipt (step 520). Next, the mobile device 102 receives an engagement indication specified by the customer through the interface element, for example, the customer provides a referral or submits an application for the position in the employment vacancy (step 525). The engagement and details related to the engagement, such as candidate profile, desired employment vacancy, job goals, application, current job profile of the candidate, may be sent and received by the payment processing system (steps 527 and 530). Goals may include, but are not limited to, a management goal, a certification goal, a salary goal, and an advancement path goal.

The payment processing system 112 may then compare the desired employment profile listed by the merchant with the received candidate's employment application to determine if there is a best candidate match (step 535). In case there is a match, the merchant is presented with at least one potential candidate meeting the requirements of the employment profile, where the potential candidate may be the customer or a contact of the customer (step 540). The merchant via the payment processing system 112 may communicate with the potential candidate, in the form of an email message, text message, or any other means of communication, and schedule an interview for the employment vacancy (step 545).

The potential candidate may also receive an offer letter if the interview is not required, e.g., if the merchant has already interviewed the customer at the time of transaction. The offer letter may be rendered using at least preferred or selected method of communication. In all such cases, the merchant may update the employment database to reflect the status of the employment vacancy. For example, if the merchant is in the interview stage, it may update the status to "pending but close to finalization" or if the merchant has extended an offer letter, the merchant may update the status to "Pending approval" or if a candidate has accepted or rejected an employment offer extended to him, the status could be set to "approved," "rejected," or "rejected and reopened" as the case may be.

Depending on the rules assigned to reward allocation, the payment processing system 112 may query the job database 154 to determine if the candidate is due to receive a reward based for example their referrals or acceptance of an employment offer. To this end, the payment processing system 112 may communicate such rewards to the customer on the mobile device 104. Alternatively, such rewards may be stored as coupons or points in a customer account and applied to their account either in response to customer's manual selection of said rewards or automatically based on the nature of the reward. For example, the reward of 10% on the next purchase at merchant A may automatically apply when the customer visits merchant A. In another example, a reward of 10% may only apply towards a purchase made at merchant A when the customer manually enters a code associated with the reward. In another example, the reward may be a cash reward that may apply instantly as soon as the candidate or the referral accepts an employment offer.

Figure 6:
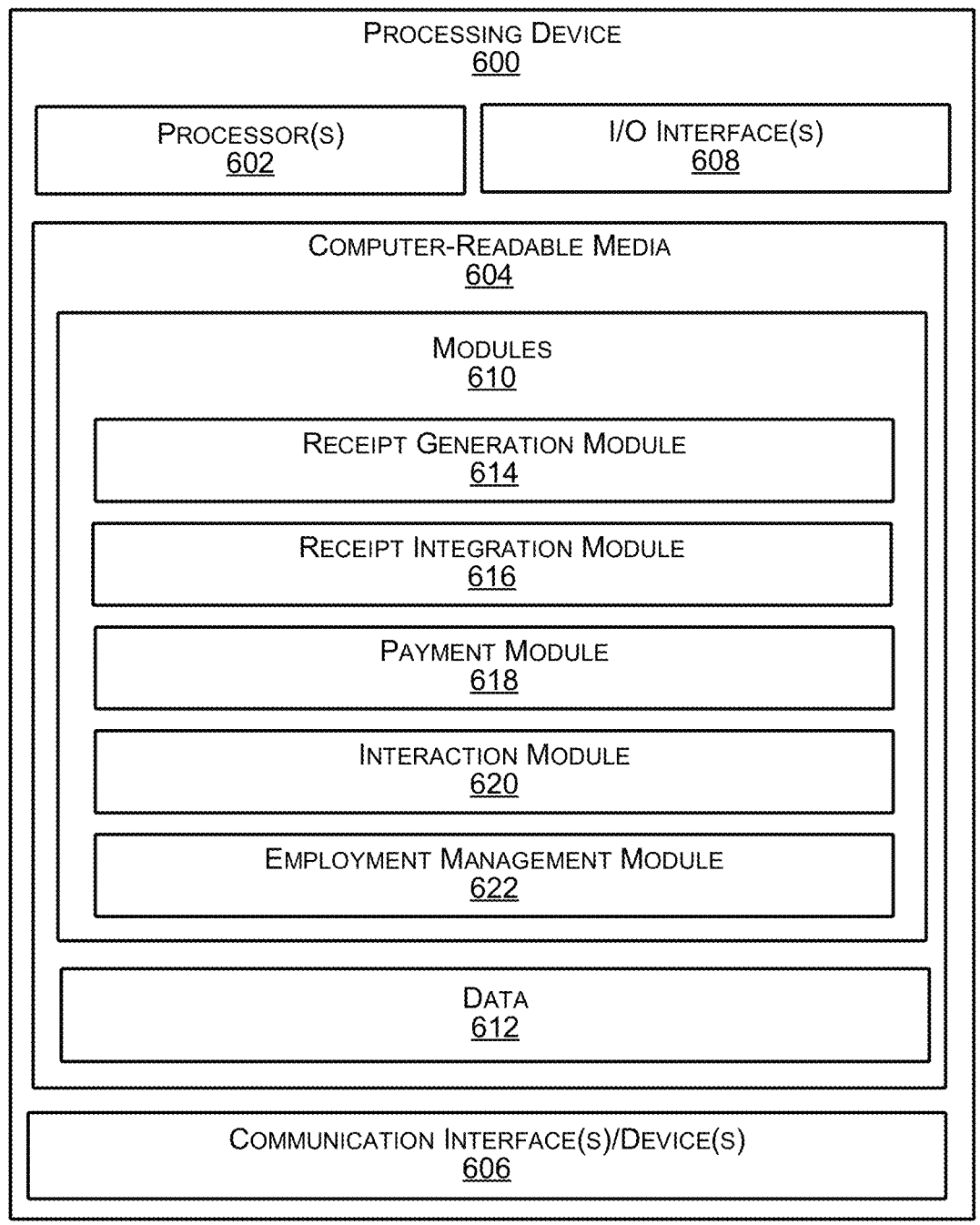
FIG. 6 is a block diagram illustrating an exemplary processing system, according to an embodiment of the present subject matter.

FIG. 6 is a high-level block diagram showing an example of a processing device 600 that can represent any of the devices described above, such as the mobile device 104, merchant device 108, employment management server 111, payment processing system 112, card payment network computing device 160, bank computing device 162. Some examples of the processing device 600 may include smart phones and mobile communication devices; tablet computing devices; laptops, netbooks and other computers; wearable computing devices and/or body-mounted computing devices, which may include watches and augmented reality devices, such as helmets, goggles or glasses; and any other device capable of sending communications and performing the functions according to the techniques described herein.

In the illustrated embodiment, the processing system 600 includes one or more processors 602, computer-readable media 604, a communication device 606, and one or more input/output (I/O) interface 608. Each processor 602 may itself comprise one or more processors or processing cores. For example, the processor 602 can be implemented as one or more microprocessors, microcomputers, microcontrollers, digital signal processors, central processing units, state machines, logic circuitries, and/or any devices that manipulate signals based on operational instructions. In some cases, the processor 602 may be one or more hardware processors and/or logic circuits of any suitable type specifically programmed or configured to execute the algorithms and processes described herein. The processor 602 can be configured to fetch and execute computer-readable processor-executable instructions stored in the computer-readable media 604.

Depending on the configuration of the processing system 600, the computer-readable media 604 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 904 may include, but is not limited to, RAM, ROM, EEPROM, flash memory, solid-state storage, magnetic disk storage, optical storage, and/or other computer-readable media technology. Further, in some cases, the processing system 600 may access external storage, such as RAID storage systems, storage arrays, network attached storage, storage area networks, cloud storage, or any other medium that can be used to store information and that can be accessed by the processor 602 directly or through another computing device or network. Accordingly, the computer-readable media 604 may be computer storage media able to store instructions, modules or components that may be executed by the processor 602. Further, when mentioned, non-transitory computer-readable media exclude media such as energy, carrier signals, electromagnetic waves, and signals per se.

The computer-readable media 604 may be used to store and maintain any number of functional components that are executable by the processor 602. In some implementations, these functional components comprise instructions or programs that are executable by the processor 602 and that, when executed, implement operational logic for performing the actions and services attributed above to the processing system 600. Functional components of the processing system 600 stored in the computer-readable media 604 may include the mobile application 134, as discussed above, which may present the user with one or more GUIs for placing an order, submitting a job application, creating a job vacancy, some examples of which are described above. Additional functional components may include an operating system (not shown) for controlling and managing various functions of the processing system 600 and for enabling basic user interactions with the processing system 600.

In addition, the computer-readable media 604 may also store data, data structures and the like, that are used by the functional components. Depending on the type of the processing system 600, the computer-readable media 604 may also optionally include other functional components and data, such as modules 610 and data 612, which may include applications, programs, drivers, etc., and the data used or generated by the functional components. For example, the processing system 600 may include a receipt generation module 614 (to generate and/or display an interactive digital receipt in response to transaction that may or may not include information pertaining to a job at a merchant's location), a receipt integration module 616 (to combine the transaction receipt with employment vacancy information), a payment module 618 (to receive account information from users and connect with banks and other financial institutions to process transactions), an interaction module 620, such as the user interaction module 146 and a merchant interaction module 148 (to allow interactions among user devices, merchant devices, and other network servers), an employment management module 622 (to allow users and merchants to maintain their applications and vacancies respectively, and allow analysis of the stored information), and so on. The data 612 may include user account information 156 and merchant information 158, which further includes both financial and employment related information related to the users and the merchants. Further, the processing system 600 may include many other logical, programmatic and physical components, of which those described are merely examples that are related to the discussion herein.

The communication device 606 may be or include sensors and devices, for example, an Ethernet adapter, cable modem, Wi-Fi adapter, cellular transceiver, Bluetooth transceiver, GPS receiver, accelerometer, etc., or a combination thereof. The GPS receiver may be able to indicate location information, an accelerometer may be able to indicate various patterns of motion, as well as other sensors (not shown) such as a gyroscope, compass, proximity sensor, and the like. In some cases, the GPS receiver may be used by the user application to determine a current geographic location of the processing system 600. Additionally, or alternatively, the communication devices 606 may be used to determine the current location of the processing system 600, such as based on communication with nearby cell towers, wireless access points, and the like. In some examples, the processing system 600 may use various geolocation techniques, mapping services, e.g., a web mapping service application, or the like, to determine location data to be communicated to the another server. The communication device 606 may operate on communication interface(s) that may include one or more interfaces and hardware components for enabling communication with various other devices, such as over the network(s), or directly. For example, communication interface(s) may enable communication through one or more of the Internet, cable networks, cloud network, cellular networks, wireless networks (e.g., Wi-Fi) and wired networks (e.g., fiber optic, Ethernet), as well as close-range communications such as BLUETOOTH®, BLUETOOTH® low energy, and the like, as additionally enumerated elsewhere herein.

The processing system 600 may also include I/O interfaces 608. Depending on the specific nature and purpose of the processing device 600, the I/O interfaces 608 may be connected to devices such as a display (which may be a touch screen display), audio speaker, keyboard, mouse and various user controls (e.g., buttons, a joystick, a keyboard, a keypad, etc.), a haptic output device, microphone, camera, etc. Depending on the type of computing device used as the processing system 600, the display may employ any suitable display technology. For example, the display may be a liquid crystal display, a plasma display, a light emitting diode display, an OLED (organic light-emitting diode) display, an electronic paper display, or any other suitable type of display able to present digital content thereon. In some examples, the display may have a touch sensor associated with the display to provide a touchscreen display configured to receive touch inputs for enabling interaction with a GUI presented on the display. Accordingly, implementations herein are not limited to any particular display technology. Alternatively, in some examples, the processing system 600 may not include a display. In one implementation, the integrated interactive digital receipt, i.e., one having the transaction and job information, may be displayed on the display.

Unless contrary to physical possibility, it is envisioned that (i) the methods/steps described above may be performed in any sequence and/or in any combination, and that (ii) the components of respective embodiments may be combined in any manner.

Note that any and all of the embodiments described above can be combined with each other, except to the extent that it may be stated otherwise above or to the extent that any such embodiments might be mutually exclusive in function and/or structure.

Although the present subject matter has been described with reference to specific exemplary embodiments, it will be recognized that the subject matter is not limited to the embodiments described, but can be practiced with modification and alteration within the spirit and scope of the appended claims. Accordingly, the specification and drawings are to be regarded in an illustrative sense rather than a restrictive sense. It will thus be appreciated that those skilled in the art will be able to devise various arrangements that, although not explicitly described or shown herein, embody the principles of the present subject matter. Furthermore, all examples recited herein are intended to be for illustrative purposes only to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

It should also be appreciated by those skilled in the art that any block diagrams, steps, or sub-processes herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown. The order in which the methods are described are not intended to be construed as a limitation, and any number of the described method blocks can be deleted, moved, added, subdivided, combined, and/or modified in any order to implement the methods, or an alternative combination or sub-combinations. Also, while steps, sub-processes or blocks are at times shown as being performed in series, some steps, sub-processes or blocks can instead be performed in parallel, or can be performed at different times as will be recognized by a person of ordinary skill in the art. Further any specific numbers noted herein are only examples; alternative implementations can employ differing values or ranges. Furthermore, the methods can be implemented in any suitable hardware, software, firmware, or combination thereof.

Reference to an "embodiment" in this document does not limit the described elements to a single embodiment; all described elements may be combined in any embodiment in any number of ways. Furthermore, for the purposes of interpreting this specification, the use of "or" herein means "and/or" unless stated otherwise. The use of "a" or "an" herein means "one or more" unless stated otherwise. The use of "comprise," "comprises," "comprising," "include," "includes," and "including" are interchangeable and not intended to be limiting. Also, unless otherwise stated, the use of the terms such as "first," "second," "third," "upper," "lower," and the like do not denote any spatial, sequential, or hierarchical order or importance, but are used to distinguish one element from another. It is to be appreciated that the use of the terms "and/or" and "at least one of", for example, in the cases of "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

It will also be appreciated by those skilled in the art that the words during, while, and when as used herein are not exact terms that mean an action takes place instantly upon an initiating action but that there may be some small but reasonable delay, such as a propagation delay, between the initial action and the reaction that is initiated by the initial action. As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to non-transitory tangible, physical objects that store information in a form that is readable by a computer. These terms exclude any transitory wireless signals, wired download signals, and any other ephemeral signals. The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

What is claimed is:

1. A method comprising:

receiving, by one or more network-based devices of a payment-processing system (PPS), from a first device communicatively connected to the one or more network-based devices of the PPS, first data representing a first payment transaction between a first payee associated with the first device and a payor, wherein the PPS is associated with a database of vacancies at one or more payee locations associated with at least the first payee and a second payee;

receiving, by the one or more network-based devices of the PPS, from a second device communicatively connected to the one or more network-based devices of the PPS, second data corresponding to a second payment transaction associated with the second payee associated with the second device;

based at least in part on the first data, processing, by the one or more network-based devices of the PPS, a first payment for the first payment transaction;

based at least in part on the second data, processing, by the one or more network-based devices of the PPS, a second payment for the second payment transaction;

at least partly responsive to processing the first payment, generating, by the one or more network-based devices of the PPS, an interactive digital proof of transaction comprising:

a first portion configured to present details of the first payment transaction; and a second portion configured to present an indication of an availability of at least one of a resource at a payee location associated with the payor or a vacancy at the payee location, wherein data associated with the vacancy is stored in the database of vacancies;

receiving, by the one or more network-based devices of the PPS and from at least one of the first device or a third device associated with the first payee or the payor, third data provided via the interactive digital proof of transaction, wherein the third data includes at least one of:

an indication that at least one of the payor or a contact of the payor is interested in the resource or the vacancy;

a request for the resource or the vacancy by or on behalf of at least one of the payor or the contact of the payor; or a referral for the contact of the payor.

2. The method of claim 1, further comprising identifying, by the one or more network-based devices of the PPS, user information associated with the at least one of the payor or the contact of the payor, the user information comprising at least one of:

a transaction history of a payment instrument associated with the at least one of the payor or the contact, the transaction history indicating transactions between the at least one of the payor or the contact and at least one of a group of merchants associated with the PPS;

geolocation information indicating user device locations at which a user device associated with the at least one of the payor or the contact has been; or an employment history indicating current or previous jobs of the at least one of the payor or the contact.

3. The method of claim 2, further comprising identifying, by the one or more network-based devices of the PPS, the availability of the at least one of the resource or the vacancy, the identifying comprising at least one of:

determining that the at least one of the group of merchants indicated in the transaction history is similar to the first payee;

determining that the user device locations indicated by the geolocation information are relevant to the first payee; or determining that at least one of the current or previous jobs of the at least one of the payor or the contact are relevant to the first payee.

4. The method of claim 1, wherein:

the interactive digital proof of transaction further comprises a third portion configured to receive input that is responsive to the availability of the at least one of the resource or the vacancy; and receiving the third data provided via the interactive digital proof of transaction comprises receiving input at least partly via the third portion of the interactive digital proof of transaction.

5. The method of claim 1, wherein the availability comprises availability of a vacancy for an employment position, further comprising:

receiving, at the one or more network-based devices, a plurality of employment applications from one or more of the payor, the contact, or other parties associated with the PPS;

matching, by the one or more network-based devices, each of the plurality of employment applications with one or more specifications of the employment position;

ranking, by the one or more network-based devices, the plurality of employment applications based on the matching; and determining, by the one or more network-based devices, a candidate for the employment position from among the one or more of the payor, the contact, or the other parties based at least in part on the ranking.

6. The method of claim 1, wherein generating the interactive digital proof of transaction further includes generating a third portion configured to, upon receiving input, cause the indication of the availability of the at least one of the resource or the vacancy to be shared via at least one of an electronic mail client, a messaging client, a web client, or a social networking client.

7. The method of claim 1, wherein the first data comprises a communication identifier indicating a mode of communication for the payor, wherein the communication identifier indicates one of an electronic mail address or a mobile message address.

8. The method of claim 1, wherein the indication of availability comprises an indication of availability of a vacancy, the method further comprising:

receiving, at the one or more network-based devices, an application for an employment position associated with the vacancy; and determining, by the one or more network-based devices, an incentive for at least one of the payor or the contact, wherein the incentive is configured to be applied to a future payment transaction.

9. A system utilized by a service provider to at least partly implement a payment-processing system (PPS), the system comprising:

one or more processors;

one or more computer-readable media storing instructions that, when executed by the one or more processors, cause the one or more processors to perform operations comprising:

receiving, by one or more servers of the PPS and from a first device associated with a first payee, first data representing a first payment transaction between the first payee and a payor, wherein the PPS is associated with a database of vacancies at one or more payee locations associated with at least the first payee and a second payee;

receiving, by the one or more servers of the PPS and from a second device associated with the second payee, second data representing a second payment transaction associated with the second payee;

based at least in part on the first data, processing, by the one or more servers of the PPS, a first payment for the first payment transaction;

based at least in part on the second data, processing, by the one or more servers of the PPS, a second payment for the second payment transaction;

at least partly responsive to processing the first payment, generating, by the one or more servers of the PPS, an interactive digital proof of transaction comprising:

a first portion configured to present details of the first payment transaction; and a second portion configured to present an indication of an availability of at least one of a resource at a payee location associated with the first payee or a vacancy at the payee location, wherein data associated with the vacancy is stored in the database of vacancies;

receiving, by the one or more servers of the PPS and from at least one of the first device or a third device associated with the first payee or the payor, third data provided via the interactive digital proof of transaction, wherein the third data includes at least one of:

an indication that at least one of the payor or a contact of the payor is interested in the resource or the vacancy;

a request for the resource or the vacancy by or on behalf of at least one of the payor or the contact of the payor; or a referral for the contact of the payor.

10. The system of claim 9, the operations further comprising identifying, by the one or more servers of the PPS, user information associated with the at least one of the payor or the contact of the payor, the user information comprising at least one of:
- a transaction history of a payment instrument associated with the at least one of the payor or the contact, the transaction history indicating transactions between the at least one of the payor or the contact and at least one of a group of merchants associated with the PPS;
- geolocation information indicating user device locations at which a user device associated with the at least one of the payor or the contact has been; or
- an employment history indicating current or previous jobs of the at least one of the payor or the contact.

11. The system of claim 10, the operations further comprising identifying, by the one or more servers of the PPS, the availability of the at least one of the resource or the vacancy, the identifying comprising at least one of:
- determining that the at least one of the group of merchants indicated in the transaction history is similar to the first payee;
- determining that the user device locations indicated by the geolocation information are relevant to the first payee; or
- determining that at least one of the current or previous jobs of the at least one of the payor or the contact are relevant to the first payee.

12. The system of claim 9, wherein the availability comprises availability of a vacancy for an employment position, the operations further comprising:
- receiving, by the one or more servers of the PPS, a plurality of employment applications from one or more of the payor, the contact, or other parties associated with the PPS;
- matching, by the one or more servers of the PPS, each of the plurality of employment applications with one or more specifications of the employment position;
- ranking, by the one or more servers of the PPS, the plurality of employment applications based on the matching; and
- determining, by the one or more servers of the PPS, a candidate for the employment position from among the one or more of the payor, the contact, or the other parties based at least in part on the ranking.

13. The system of claim 9, wherein generating the interactive digital proof of transaction further includes generating a third portion configured to, upon receiving input, cause the indication of the availability of the at least one of the resource or the vacancy to be shared via at least one of an electronic mail client, a messaging client, a web client, or a social networking client.

14. The system of claim 9, wherein the first data comprises a communication identifier indicating a mode of communication for the payor, and wherein the communication identifier indicates one of an electronic mail address or a mobile message address.

15. The system of claim 9, wherein the availability comprises availability of a vacancy for an employment position, the operations further comprising:
- receiving, by the one or more servers of the PPS, an application for the employment position associated with the vacancy; and
- determining, by the one or more servers of the PPS, an incentive for at least one of the payor or the contact, wherein the incentive is configured to be applied to a future payment transaction.

16. One or more computer-readable media storing instructions executable by one or more processors, wherein the instructions program the one or more processors to perform actions comprising:
- receiving, by one or more network-based devices of a payment-processing system (PPS) and from a first device associated with a first payee, first data representing a first payment transaction between the first payee and a payor, wherein the PPS is associated with a database of vacancies at one or more payee locations associated with at least the first payee and a second payee;
- based at least in part on the first data, processing, by the one or more network-based devices of the PPS, a first payment for the first payment transaction;
- receiving, by the one or more network-based devices of the PPS, from a second device associated with the second payee, second data representing a second payment transaction associated with the second payee;
- based at least in part on the second data, processing, by the one or more network-based devices of the PPS, a second payment for the second payment transaction;
- at least partly responsive to processing the first payment, generating, by the one or more network-based devices of the PPS, an interactive digital proof of transaction comprising:
  - a first portion configured to present details of the first payment transaction; and
  - a second portion configured to present an indication of an availability of at least one of a resource at a payee location associated with the first payee or a vacancy at the payee location, wherein data associated with the vacancy is stored in the database of vacancies;
- receiving, by the one or more network-based devices of the PPS and from at least one of the first device or a second device associated with the first payee or the payor, third data provided via the interactive digital proof of transaction, wherein the third data includes at least one of:
  - an indication that at least one of the payor or a contact of the payor is interested in the resource or the vacancy;
  - a request for the resource or the vacancy by or on behalf of at least one of the payor or the contact of the payor; or
  - a referral for the contact of the payor.

17. The one or more computer-readable media of claim 16, further comprising identifying, by the one or more network-based devices, user information associated with the at least one of the payor or the contact of the payor, the user information comprising at least one of:
- a transaction history of a payment instrument associated with the at least one of the payor or the contact, the transaction history indicating transactions between the at least one of the payor or the contact and at least one of a group of merchants associated with the PPS;
- geolocation information indicating user device locations at which a user device associated with the at least one of the payor or the contact has been; or
- an employment history indicating current or previous jobs of the at least one of the payor or the contact.

18. The one or more computer-readable media of claim 17, further comprising identifying, by the one or more network-based devices of the PPS, the availability of the at least one of the resource or the vacancy, the identifying comprising at least one of:

determining that the at least one of the group of merchants indicated in the transaction history is similar to the first payee;

determining that the user device locations indicated by geolocation information are relevant to the first payee; or determining that at least one of the current or previous jobs of the at least one of the payor or the contact are relevant to the first payee.

19. The one or more computer-readable media of claim 16, wherein:

the interactive digital proof of transaction further comprises a third portion configured to receiving input that is responsive to the availability of the at least one of the resource or the vacancy; and receiving the third data provided via the interactive digital proof of transaction comprises receiving input at least partly via the third portion of the interactive digital proof of transaction.

20. The one or more computer-readable media of claim 16, wherein generating the interactive digital proof of transaction further includes generating a third portion configured to, upon receiving input, cause the indication of the availability of the at least one of the resource or the vacancy to be shared via at least one of an electronic mail client, a messaging client, a web client, or a social networking client.

* * * * *